United States Patent [19]

Ghaffari et al.

[11] Patent Number: 5,708,423
[45] Date of Patent: Jan. 13, 1998

[54] ZONE-BASED ASSET TRACKING AND CONTROL SYSTEM

[75] Inventors: Touraj Ghaffari, Boca Raton; Mark Grimes, Pompano Beach; Kevin D. Romer, Boca Raton, all of Fla.

[73] Assignee: Sensormatic Electronics Corporation, Deerfield Beach, Fla.

[21] Appl. No.: 437,313

[22] Filed: May 9, 1995

[51] Int. Cl.⁶ .................................................. H04Q 1/00
[52] U.S. Cl. ............................ 340/825.35; 340/825.31; 340/825.34; 340/572
[58] Field of Search ...................... 340/825.54, 825.49, 340/572, 573, 825.31, 825.35, 825.34

[56] References Cited

U.S. PATENT DOCUMENTS

| | | | |
|---|---|---|---|
| 3,805,265 | 4/1974 | Lester | 340/825.54 |
| 4,118,693 | 10/1978 | Novikoff | 340/572 |
| 4,471,345 | 9/1984 | Barrett, Jr. | 340/572 |
| 4,489,313 | 12/1984 | Pfister | 340/540 |
| 4,598,275 | 7/1986 | Ross | 340/573 |
| 4,636,950 | 1/1987 | Caswell | 340/825.49 |
| 4,658,357 | 4/1987 | Carroll | 340/825.49 |
| 4,827,395 | 5/1989 | Anders | 340/825.54 |
| 4,888,579 | 12/1989 | ReMine et al. | 340/572 |
| 4,952,928 | 8/1990 | Carroll | 340/825.54 |
| 5,062,151 | 10/1991 | Shipley | 340/825.49 |
| 5,321,396 | 6/1994 | Lamming | 340/825.49 |

OTHER PUBLICATIONS

Texas Instruments, *TIRIS Automatic Radio Frequency Identification System*, 1994.

*Primary Examiner*—Brian Zimmerman
*Attorney, Agent, or Firm*—Robin, Blecker, Daley and Driscoll

[57] ABSTRACT

A data processing system automatically maintains records of respective locations of a plurality of objects in real time. Each of the objects has secured thereto a respective object marker which transmits an identification signal that is unique to the respective object. Sensor devices are installed at respective doorways of a building. Each sensor device receives the identification signal transmitted from the object marker as the respective object is moved through the doorway. The sensor device detects from the identification signal a direction in which the object is being moved through the doorway and generates a detection signal indicative of the detected direction of movement and also indicative of the identification signal for the object. The data processing system receives the detection signals from the sensor devices and maintains a data record with respect to each of the objects indicating the present location in the building of each of the objects.

34 Claims, 26 Drawing Sheets

ZONE-BASED ASSET TRACKING AND CONTROL SYSTEM

CROSS-REFERENCE TO RELATED APPLICATION

Reference is made to a related application entitled "Directional Antenna Configuration for Asset Tracking System," by T. Ghaffari and L. Canipe U.S. application Ser. No. 08/437,946 now U.S. Pat. No. 5,661,457, which is commonly assigned with the present application and is being filed simultaneously with the present application.

FIELD OF THE INVENTION

This invention relates to systems for automatically monitoring and keeping track of the locations of objects by means of marker devices attached to the objects.

BACKGROUND OF THE INVENTION

There have previously been proposed systems for keeping track of the location of individuals or objects by attaching transponders to the individuals or objects and receiving identification signals transmitted by the transponders. Typically, each transponder transmits a unique identification signal which is used to identify the individual or object to which the transponder is attached. The identification signals generated by the transponders in such systems are, in general, to be received by an antenna and associated receiving circuitry. In some cases, the antenna is to be associated with a doorway or portal which gives access to a room. There has also been some consideration given to determining the direction of an object being tracked with respect to a portal. However, the systems as previously proposed have in general assumed a one-to-one relationship between a receiving antenna installation and a room, and have not integrated the concept of detecting the object's direction with requirements for a complete tracking system. More particularly, previously proposed systems have not been arranged to handle situations in which there are multiple points of access to a given room or portion of a building, and also have not considered that a given portal may be the interface between two different zones. There also has been no consideration of the fact that a building in which articles are to be tracked may include a number of controlled zones as well as areas which are not controlled.

OBJECTS AND SUMMARY OF THE INVENTION

It is accordingly an object of the invention to provide an asset tracking and control system which maintains a record of the locations of objects having transponders attached thereto in terms of zones defined within a building, where the zones have plural points of entrance and exit.

It is a further object of the invention to provide an asset tracking and control system which makes use of portal antennas which detect a direction in which items are moved through portals.

According to an aspect of the invention, there is provided a system for automatically maintaining records of respective locations of a plurality of objects in real time, with the system including a plurality of object markers each physically associated with a respective one of the plurality of objects for movement with a respective object, each marker being for transmitting an identification signal that is unique to the respective object, a plurality of sensor devices each installed at a respective doorway of a building, with each sensor device being for receiving the identification signal transmitted from the object marker as the respective object is moved through the respective doorway and for detecting a direction in which the respective object is moved through the doorway, and each sensor device generating a detection signal indicative of the detected direction of movement and the identification signal of the respective object in response to the device receiving the identification signal, and data processing means for receiving the detection signals from the sensor devices and for maintaining a data record with respect to each of the objects, with the data record including data indicative of a present location in the building of the respective object.

Further in accordance with this aspect of the invention, at least a first sensor device and a second sensor device of the plurality of sensor devices are installed at respective doorways located at respective points on a boundary of a zone in the building, the respective doorways at which the first and second sensor devices are installed each have associated therewith a first direction of movement defined as a movement into the zone and a second direction of movement defined as a movement out of the zone, with the data processing means being programmed to respond to a detection signal generated from either of the first and second sensor devices and indicative of a movement of a particular one of the objects in the first direction of movement by updating the data record for the particular one of the objects to indicate that the object is inside the zone. Still further according to this aspect of the invention, the data processing means is programmed to respond to a detection signal generated from either of the first and second sensor devices and indicative of movement of the particular one of the objects in the second direction of movement by updating the data record for the particular object to indicate that the object is not inside the zone.

Also according to this aspect of the invention, the second direction of movement at the doorway at which the first sensor device is installed is defined as a movement into a second zone, and the data processing means is programmed to respond to a detection signal generated from the first sensor device and indicative of a movement of the particular one of the objects in the second direction of movement by updating the data record for the particular object to indicate that the object is inside the second zone.

Further in accordance with this aspect of the invention, at least some of the sensor devices may include means for detecting the direction in which the respective object is moved through the doorway on the basis of the received identification signal, and may also include a plurality of motion detection means for detecting the presence of objects regardless of whether the objects have an object marker physically associated therewith, with such sensor devices also being arranged to detect the direction in which the respective object is moved through the doorway on the basis of signals output from the respective plurality of motion detection means.

According to another aspect of the invention, there is provided a system for selectively inhibiting movement of an object, including marker means, physically associated with the object, for transmitting a marker signal, sensor means installed at a doorway, for receiving the marker signal transmitted from the marker means as the object is moved through the doorway and detecting from the marker signal a direction in which the object is moved through the doorway, and control means responsive to the sensor means for inhibiting movement of the object in the detected direction of movement if the movement of the object in the detected direction is not authorized.

According to still another aspect of the invention, there is provided a system for determining that the respective positions of a plurality of object within a storage facility that includes a plurality of object storage locations, with the system including a plurality of object markers each physically associated with a respective one of the plurality of objects for movement with the respective object, and each of the markers transmitting a marker signal that is indicative of the presence of the respective object, a plurality of sensor devices each installed at a respective one of the object storage locations in the facility for receiving a respective marker signal for an object present at the respective storage location, and data processing means connected to the sensor devices for storing with respect to each storage location an indication signal which indicates whether one of the objects is present at the storage location.

DESCRIPTION OF PREFERRED EMBODIMENTS

System Overview

Figure 1:
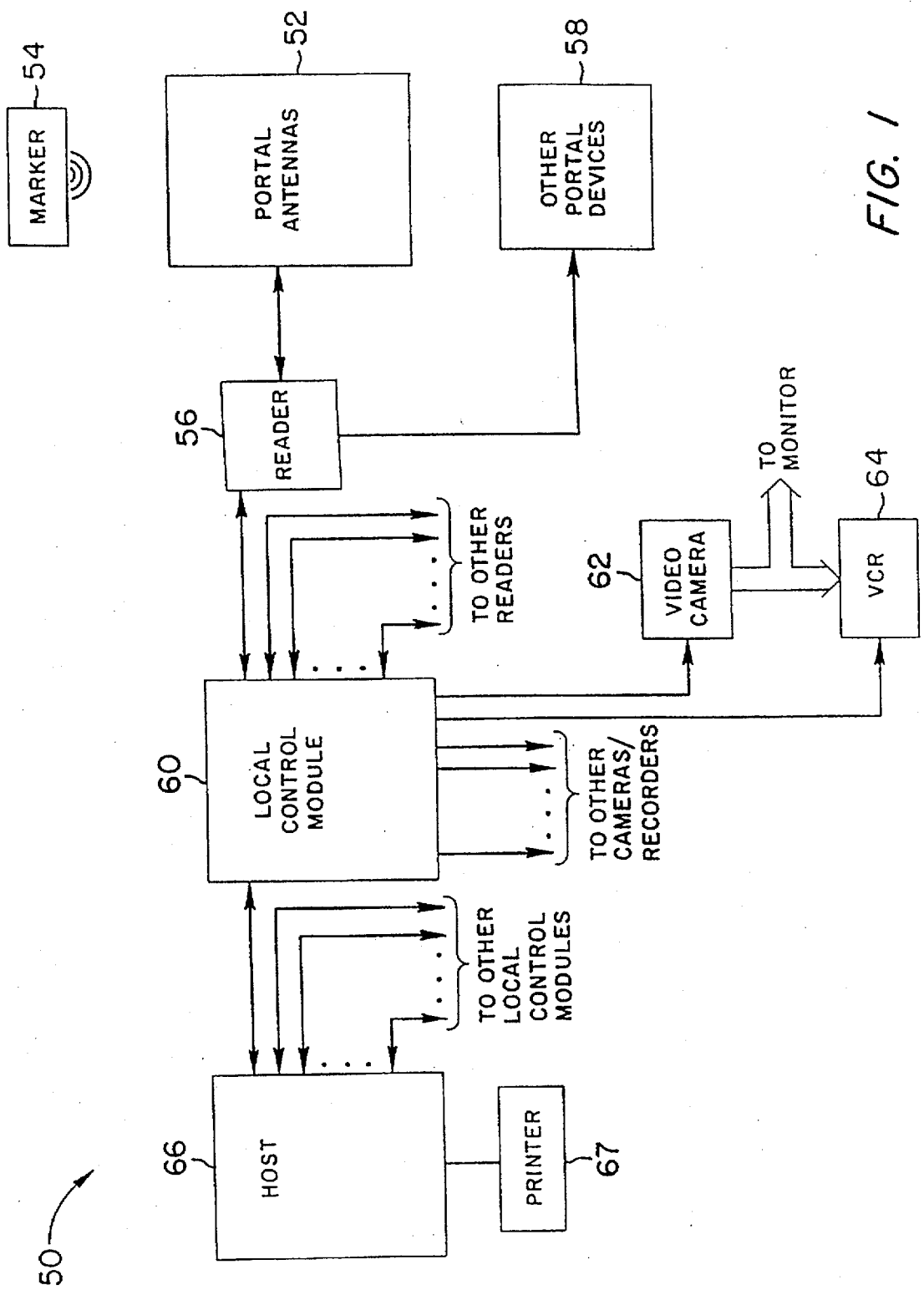
FIG. 1 is a block diagram of an asset control and tracking system in accordance with the invention.

A system provided in accordance with the invention for controlling and tracking the movement of objects will now be described in overview, with initial reference to FIG. 1. In FIG. 1, reference numeral 50 generally indicates an asset tracking system. The system 50 includes a group of antennas 52 installed in association with a portal or doorway. As will be described in more detail below, the portal antennas 52 are arranged to receive signals generated by a marker 54.

A marker signal reader device 56 is connected to the portal antennas 52. The reader 56 controls operation of the portal antennas 52 and reads data present in the signal generated by the marker 54 and received via the antennas 52.

The reader 56 is preferably also connected to receive data from other devices installed at the portal and in addition, or alternatively, the reader 56 may be connected to control other devices installed at the portal. These other devices are represented by a block 58, and may include, for example, an electro-mechanical door lock that can be released by remote control and is installed as a locking device in a door (not shown) which selectively prevents passage through the portal. Other devices connected to the reader 56 may include a biometric reading unit, such as a conventional fingerprint or palm geometry scanner, and indication lights for selectively indicating whether an ID badge is valid, whether passage by an individual through the portal is authorized, whether movement of assets through the portal is authorized, and so forth.

The reader 56 is also connected to exchange data with a local control module 60. The data provided from the reader 56 to the control module 60 may include data contained in the signal generated by the marker 54 and received through the antennas 52. The marker signal preferably uniquely identifies the marker 54, and hence an object (not shown) to which the marker 54 is attached. As will be seen, the marker 54 may be attached either to a person or to a valuable item such as a piece of electronic equipment, the location of which is to be kept track of by the system 50.

The data provided from the control module 60 to the reader 56 may include appropriate commands, such as commands indicating whether passage of a marker and its associated objects through the portal is authorized or is not authorized. Preferably, the control module 60 includes at least a portion of a database which stores information indicative of the identification codes of markers that are authorized for passage through the portal at which the portal antennas 52 are installed. The information in the database may also indicate identification codes representative of individuals authorized to move the markers and associated objects through the portal.

Preferably, the control module 60 is arranged to exchange data with several other readers like reader 56, which are respectively connected to antenna installations at other portals. The control module 60 may also be arranged to control a video camera 62 and VCR 64. The control module 60 selectively controls the camera 62 and VCR 64 to generate and store a video image of events occurring at the portal. The signal generated by the camera 62 may be displayed on a monitor (not shown) located in a facility security office. The control module 60 may be used to control other cameras and recorders (not shown) in addition to the camera 62 and VCR 64 associated with the portal controlled by the reader 56.

The control module 60 is preferably constituted by hardware of known design, such as the equipment marketed by the assignee of this application, under the name "SensorPanel", for card access control applications.

The database stored in the local control module 60 is preferably downloaded to the control module 60 from a host computer 66, which may be a personal computer operating with the UNIX or DOS operating system and INFORMEX database software. Local control module 60 periodically uploads to the host 66 information which includes identification numbers of markers which pass through portals, the locations of the portals, and direction and time of passage. The uploading of data from the module to the host 66 may be at quite frequent intervals, enabling the host 66 to maintain a virtually real-time record of the movements of articles to which markers are attached. The host 66 may be connected to other local control modules (not shown), including perhaps several hundred such modules.

A printer 67 is connected to host computer 66 and may be used to print reports of data stored in the host 66. The reports may include data concerning present and past locations of objects associated with respective markers. Such reports may be used for inventorying assets, including physical verification of inventory, and/or scheduling or keeping track of maintenance activities.

Antenna Configuration

Figure 2:
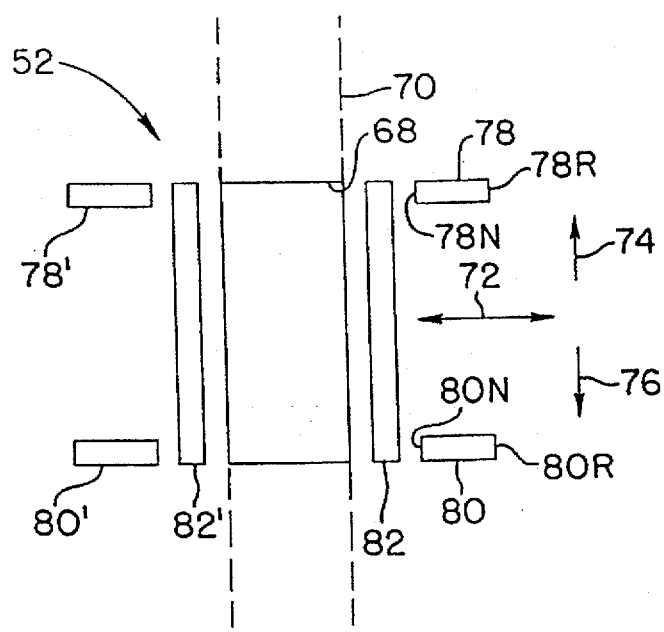
FIG. 2 is a schematic plan view of an antenna configuration installed in association with a doorway in accordance with the invention.

FIG. 2 illustrates in schematic plan view a configuration of the portal antennas 52 installed in association with a doorway 68 formed in a wall 70. The doorway 68 defines a path of travel (represented by double-headed arrow 72) through the doorway 68 from one side of the doorway to another. Right and left directions transverse to the path of travel are respectively indicated by arrows 74 and 76. The antenna configuration 52 includes substantially equivalent sets of antennas respectively on each side of the doorway 68 and arranged back-to-back as mirror images of each other, with the doorway 68 in between. On a first side of the doorway 68, there are provided left- and right-hand passage antennas 78 and 80, respectively displaced in the transverse directions 74 and 76 from the path of travel 72. The passage antennas 78 and 80 are preferably planar coil antennas provided in respective planes that are parallel to the path of travel 72. The antenna configuration on the side of the antennas 78 and 80 preferably also includes a shorted loop 82 provided in a plane which is normal to the path of travel 72 and close enough to the antennas 78 and 80 (preferably within two inches) to provide non-contact coupling between the shorted loop 82 and the antennas 78 and 80. The shorted loop 82 circumscribes the doorway 68 so that persons and objects passing through the doorway 68 also pass through the shorted loop 82, in addition to passing between the passage antennas 78 and 80. The shorted loop 82 may be provided in a position (as shown in FIG. 2) such that it is interposed between the antennas 78 and 80 and the doorway 68. Accordingly, the shorted loop 82 is closer to near ends 78N and 80N of the antennas 78 and 80 than it is to far ends 78R and 80R of the antennas, with the ends 78N and 80N being closer to the doorway 68 than the ends 78R and 80R.

As shown in FIG. 2, the arrangement of the antennas on the other side of the doorway from antennas 78 and 80 and shorted loop 82 is identical to that already described with respect to the first side of the doorway, except that the arrangement is mirror-symmetric with respect to the doorway 68 as compared to the arrangement of the antennas 78, 80 and 82. In particular, on the other side of the doorway 68, there is provided a shorted loop 82' interposed between the doorway 68 and passage antennas 80' and 78'

Practical embodiments of the antenna configuration 52 will now be described with reference to FIGS. 4–6.

Figure 4:
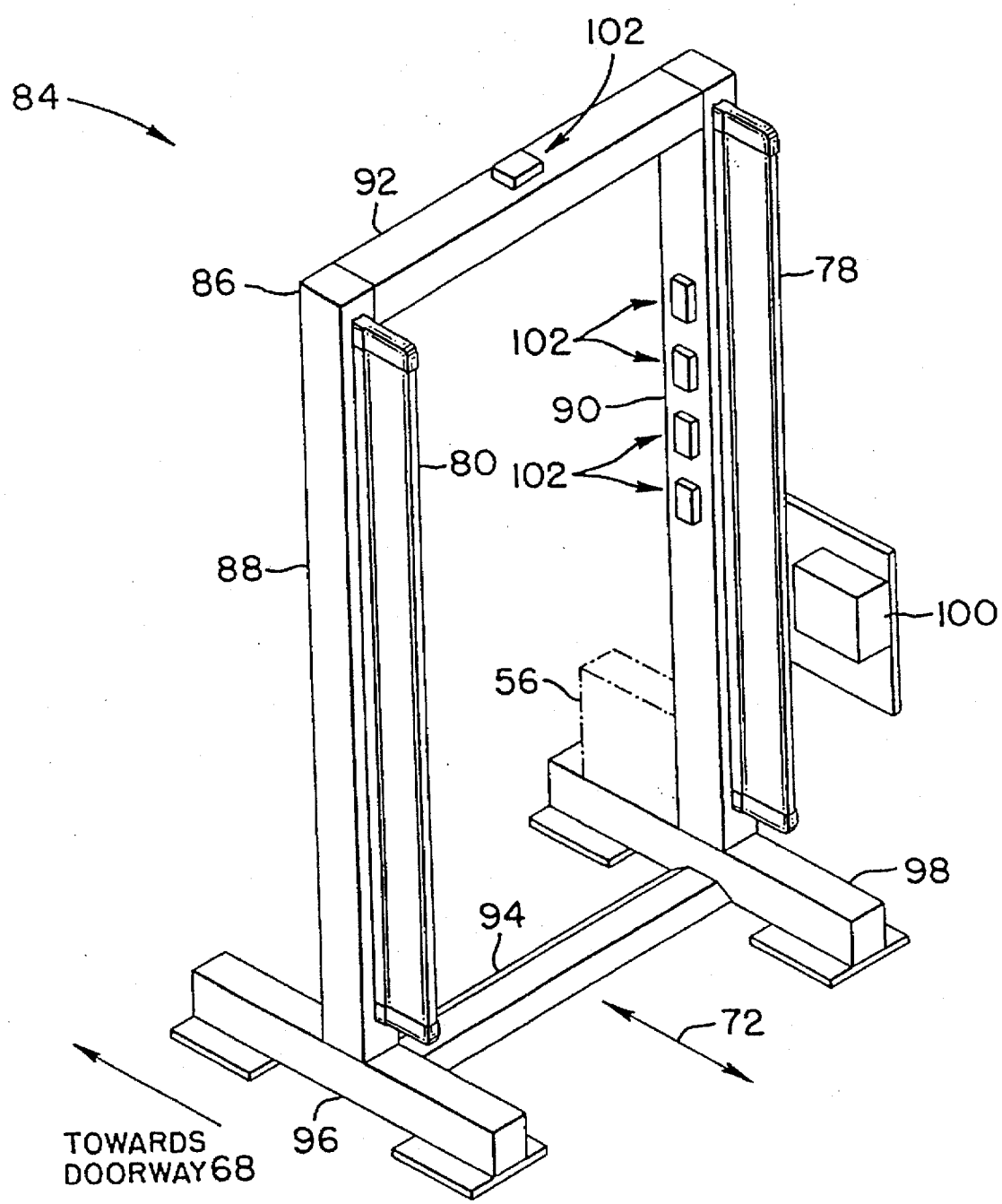
FIG. 4 is a perspective view of a portable antenna structure that may be used as part of the antenna configuration of FIG. 2.

For example, FIG. 4 shows a portable antenna assembly 84 which may be used to provide the portion of the antenna configuration 52 on one side of a doorway 68 (not shown in FIG. 4), with the portion of the antenna assembly on the other side of the doorway being constituted by another portable assembly 84 pointing in the opposite direction from the assembly on the first side. It will be seen that the assembly 84 includes a portal frame 86 which includes left- and right-side upright members 88 and 90. The upright members 88 and 90 respectively have mounted thereon the above-mentioned passage antennas 80 and 78. A top horizontal member 92 is supported between the uprights 88 and 90 at respective top ends of the uprights, and a threshold strip 94 is provided on the floor extending between respective bottom ends of the members 88 and 90. The members 88, 90 and 92 are hollow to permit the shorted loop 82 to be run therethrough, and a bottom horizontal segment of the shorted loop 82 is provided underneath the threshold strip 94 to complete the portal-circumscribing loop 82. A rug or floor mat may be provided in place of the threshold strip 94 for the purpose of covering the bottom segment of the shorted loop.

The upright members 88 and 90 are respectively supported on left and right side leg members 96 and 98. A reader module 56, like that mentioned above, for controlling the antenna assembly 84 and reading data present in marker signals received via the antenna assembly 84, is shown in phantom mounted on the leg member 98 of the assembly. It should be noted that the reader 56 may alternatively be located at some distance from the antenna assembly 84, for instance on the antenna assembly located on the opposite side of the doorway.

A biometric unit 100 is shown in FIG. 4 as being mounted on or near the antenna assembly 84. The biometric unit 100 may be, for example, a conventional fingerprint reader or hand geometry reader which is connected to provide information for identity validation to the reader 56. A conventional bar code or magnetic stripe card reader may be provided in addition to or instead of the biometric unit 100.

The portal frame 86 has mounted thereon several lamps 102 which are selectively illuminated under the control of the reader 56 to indicate conditions such as: power on for the antenna assembly 84; badge OK but access denied; badge not OK; removal of item not authorized; and so forth.

Figure 5:
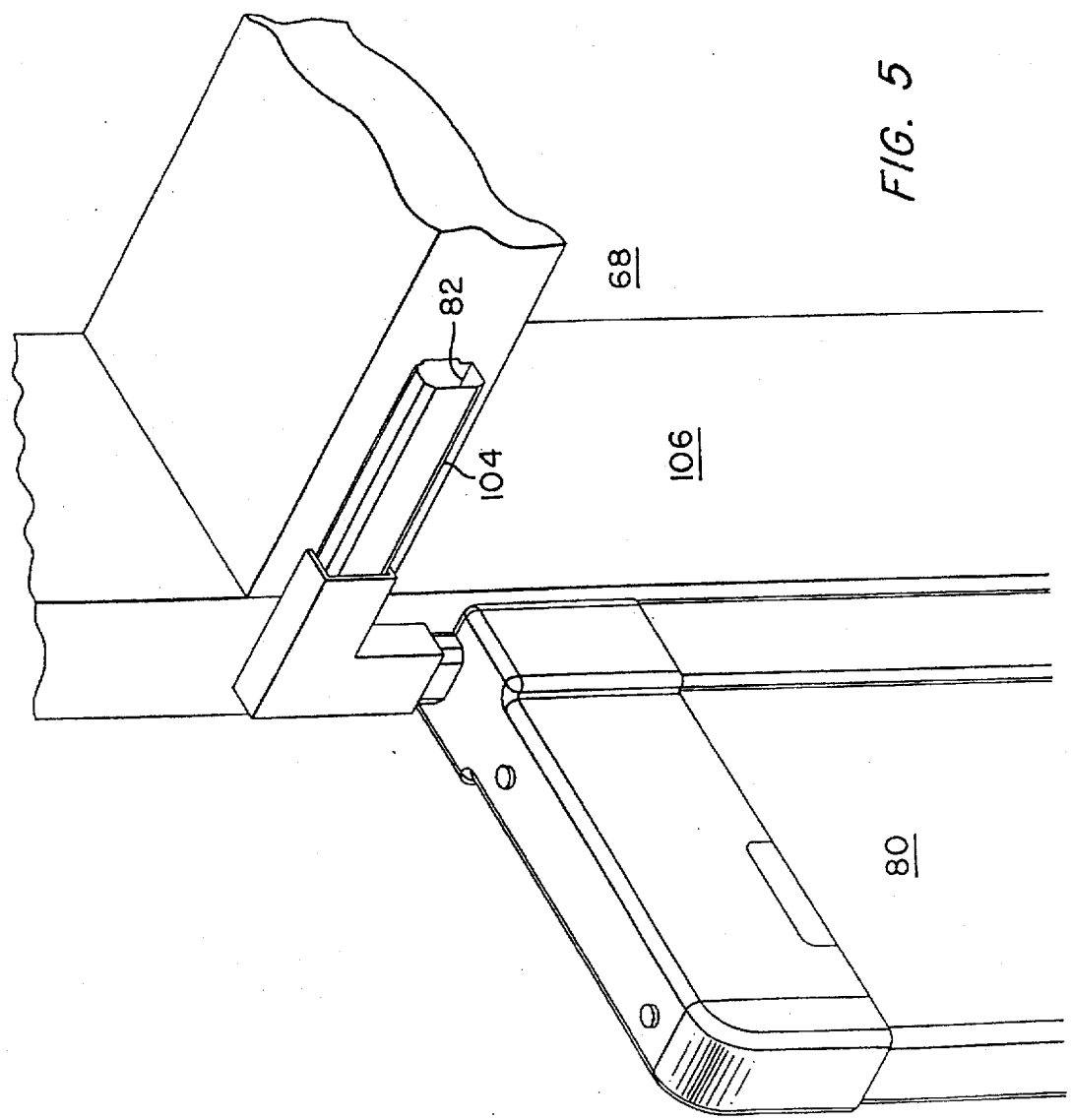
FIG. 5 is a perspective view of a portion of an antenna configuration permanently installed on one side of a doorway.
Figure 6:
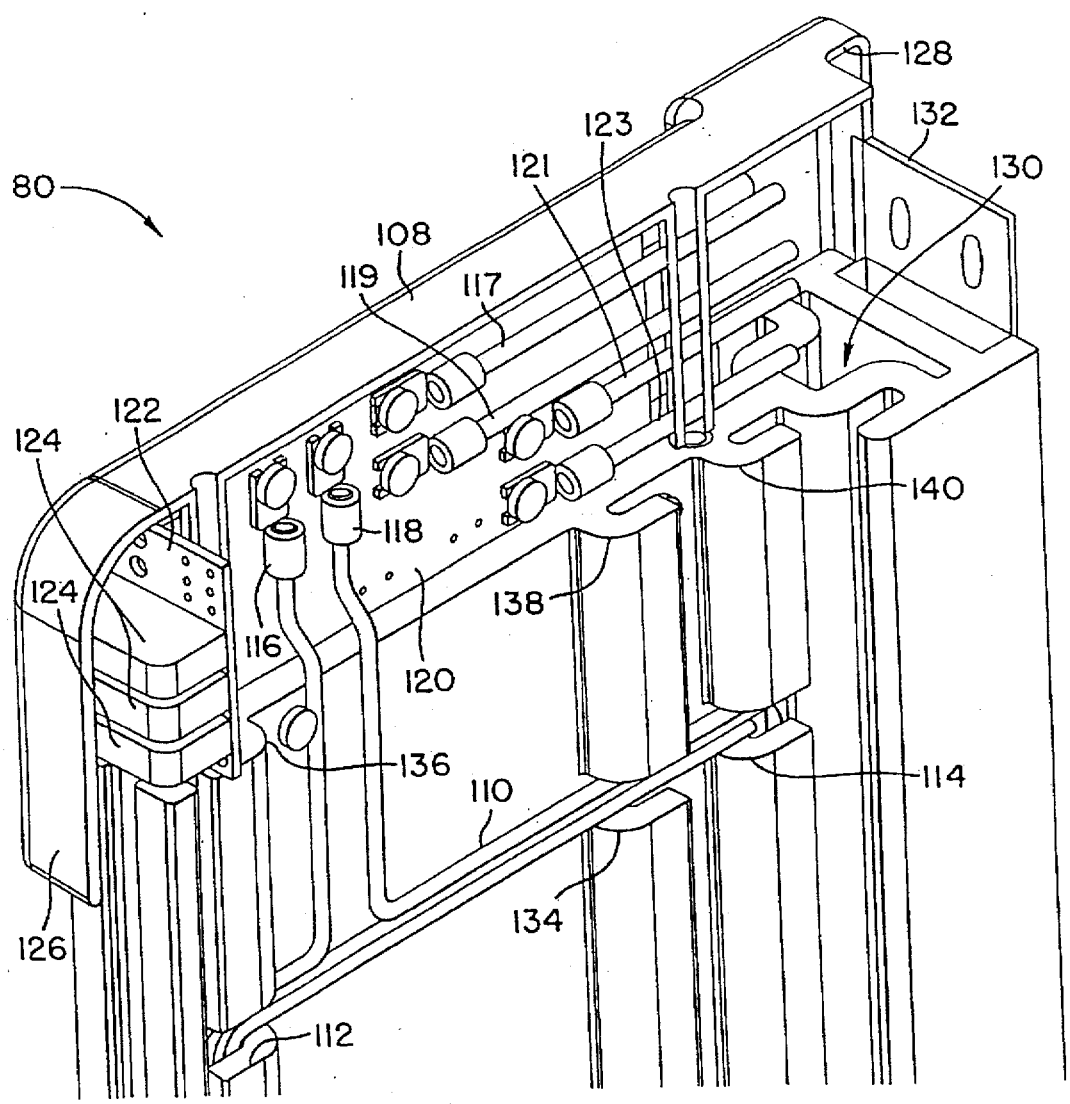
FIG. 6 is a perspective view of a portion of the antenna configuration of FIG. 5, with the cover removed therefrom.

An alternative arrangement providing the antenna configuration at a doorway is illustrated in FIGS. 5 and 6. FIG. 5 shows portions of a passage antenna 80 and a shorted loop conduit 104 mounted directly on a door frame 106 of doorway 68. The conduit 104 is provided to accommodate the shorted loop 82, which circumscribes the doorway 68 by following the frame 106 up over and down around the doorway 68. As in the arrangement of FIG. 4, a threshold strip 94 (not shown in FIG. 5) may be provided to cover the bottom horizontal segment to the shorted loop, or the bottom segment may be run underneath a carpet or mat. The shorted loop is preferably formed of a single 18 AWG wire.

It will be understood that the installation configuration partially shown in FIG. 5 includes a right-hand passage antenna 78 (not shown in FIG. 5) as well as a corresponding installation on the opposite side of doorway 68 comprising passage antennas 78' and 80' and an associated shorted loop 82' to complete the configuration shown in FIG. 2.

FIG. 6 is a perspective view of the passage antenna 80 with the cover removed to show the interior structure of the antenna. As seen from FIG. 6, the antenna 80 includes a housing 108, preferably formed of molded plastic. Provided within the housing 108 is a planar antenna coil 110 formed of a conductor such as litz wire wound in three turns around flanges 112 and 114 integrally formed with the housing 108 and inside the antenna 80. In a preferred embodiment of the invention, the dimensions of the coil 110 are about 4 inches×59 inches with the housing 108 being about 1 inch×6.5 inches×77 inches. Ends 116 and 118 of the conductor making up the antenna coil 110 are connected to a terminal board 120, through which the antenna coil 110 is connected to the reader 56 (via outgoing leads 117 and 119).

According to certain alternative practices in accordance with the invention, the shorted loop 82 may be used actively for transmitting marker interrogation signals, and/or may be open-circuited during marker signal receiving operations. For these purposes, leads 121, 123 are provided on terminal board 120 for connection to the shorted loop 82. It is noted that shorted loop 82 is not shown in FIG. 6, nor is the connection between leads 121 and 123 and shorted loop 82. Moreover, in applications in which the shorted loop 82 operates only by inductive coupling with the antenna coil 110 the leads 121, 123 may not be connected to the shorted loop.

Continuing to refer to FIG. 6, the antenna 80 further includes an LED board 122, which has mounted thereon several LEDs 124 which are selectively illuminated under control of the reader 56 in the same manner as the indicator lamps 102 discussed in connection with FIG. 4. The casing 108 includes a transparent portion 126 to allow the status of the LEDs 124 to be visible from outside of the antenna 80.

A slot 128 and channel 130 are formed in the housing 108 to accommodate the shorted loop conduit 104, within which, as noted before, the shorted loop 82 is provided. A bracket 132, integrally formed with the housing 108, is provided to facilitate mounting the antenna 80 on the door frame 106 (FIG. 5).

It will be noted that the housing 108 has integrally formed therein a third vertically extending flange 134 which is parallel to and provided between the flanges 112 and 114 and adjacent to the flange 114. The additional flange 134 is provided so that, in alternative embodiments of the antenna 80, the coil 110 may be wound to provide a somewhat smaller dimension in the direction of the path of travel, or to accommodate an alternative position for the shorted loop 82.

In accordance with the latter alternative, it will be understood that the shorted loop can be guided by the flange 134, rather than the channel 130, so that there may be stronger coupling between the shorted loop 82 and the antenna coil 110.

In still another alternative embodiment, the antenna coil 110 is wound using flange 134, rather than flange 114, and flange 114 may be used instead of channel 130 for guiding the shorted loop 82.

It will be seen that the housing 108 also has formed integrally therewith supplemental flanges 136, 138 and 140, respectively provided above and in alignment with the flanges 112, 134 and 114. The supplemental flanges 136, 138 and 140 are provided to permit the vertical dimension of the antenna coil 110 to be increased by a modest amount in an alternative embodiment of the antenna 80.

Reader Unit

Figure 10:
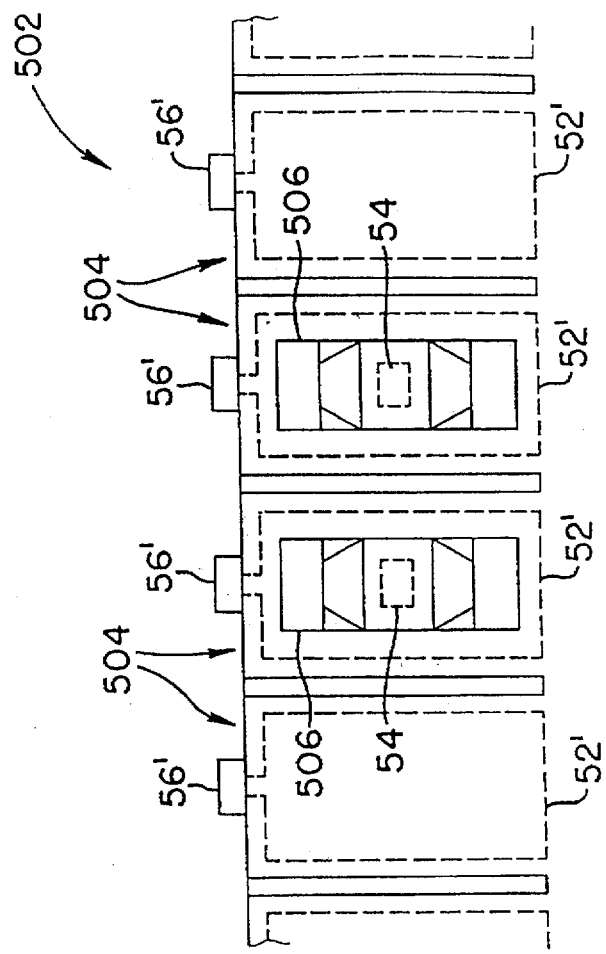
FIG. 10 is a block diagram of a marker signal reader that is part of the asset tracking system of FIG. 1.
Figure 11:
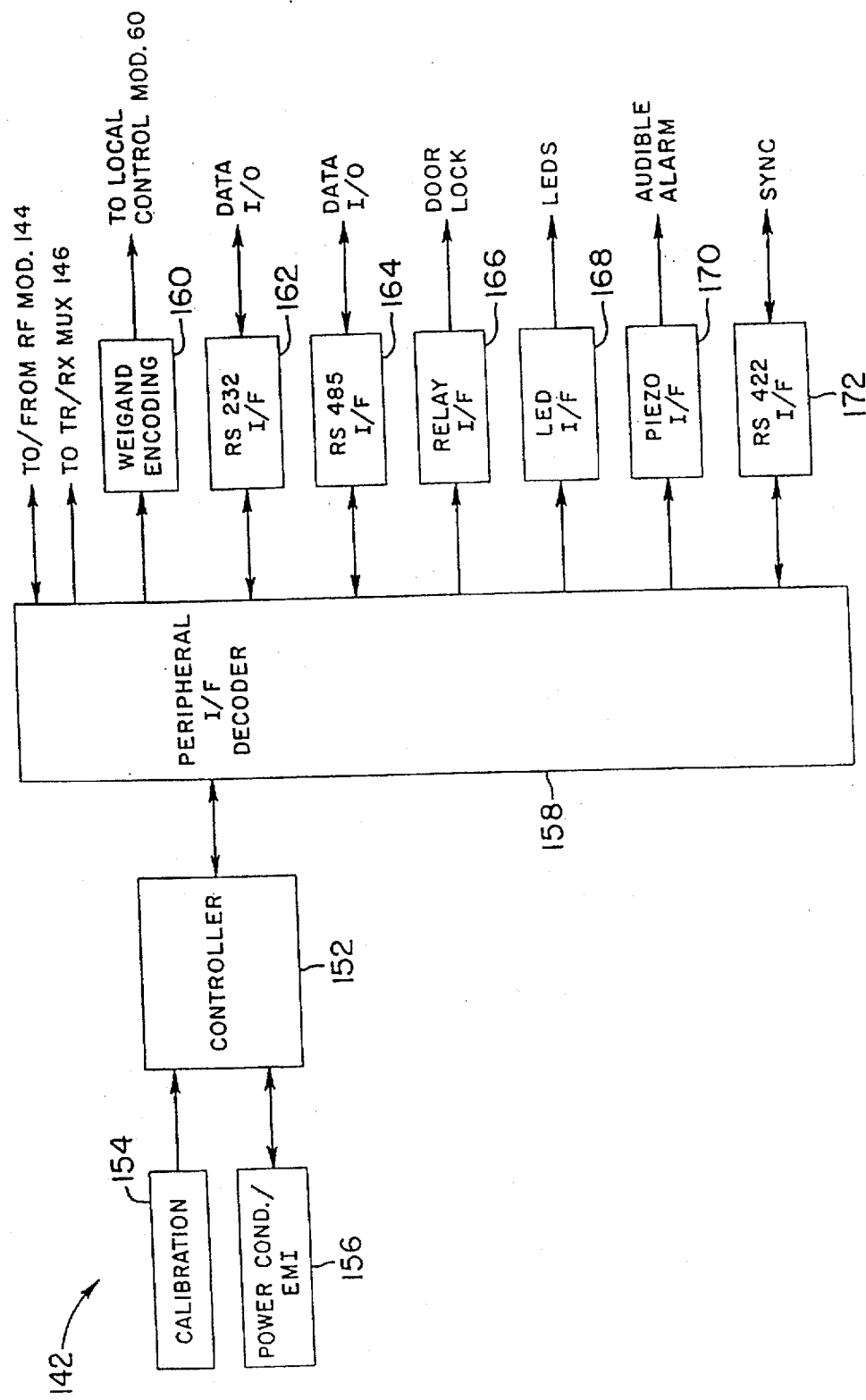
FIG. 11 is a block diagram of a main controller board that constitutes a portion of the reader of FIG. 10.
Figure 12:
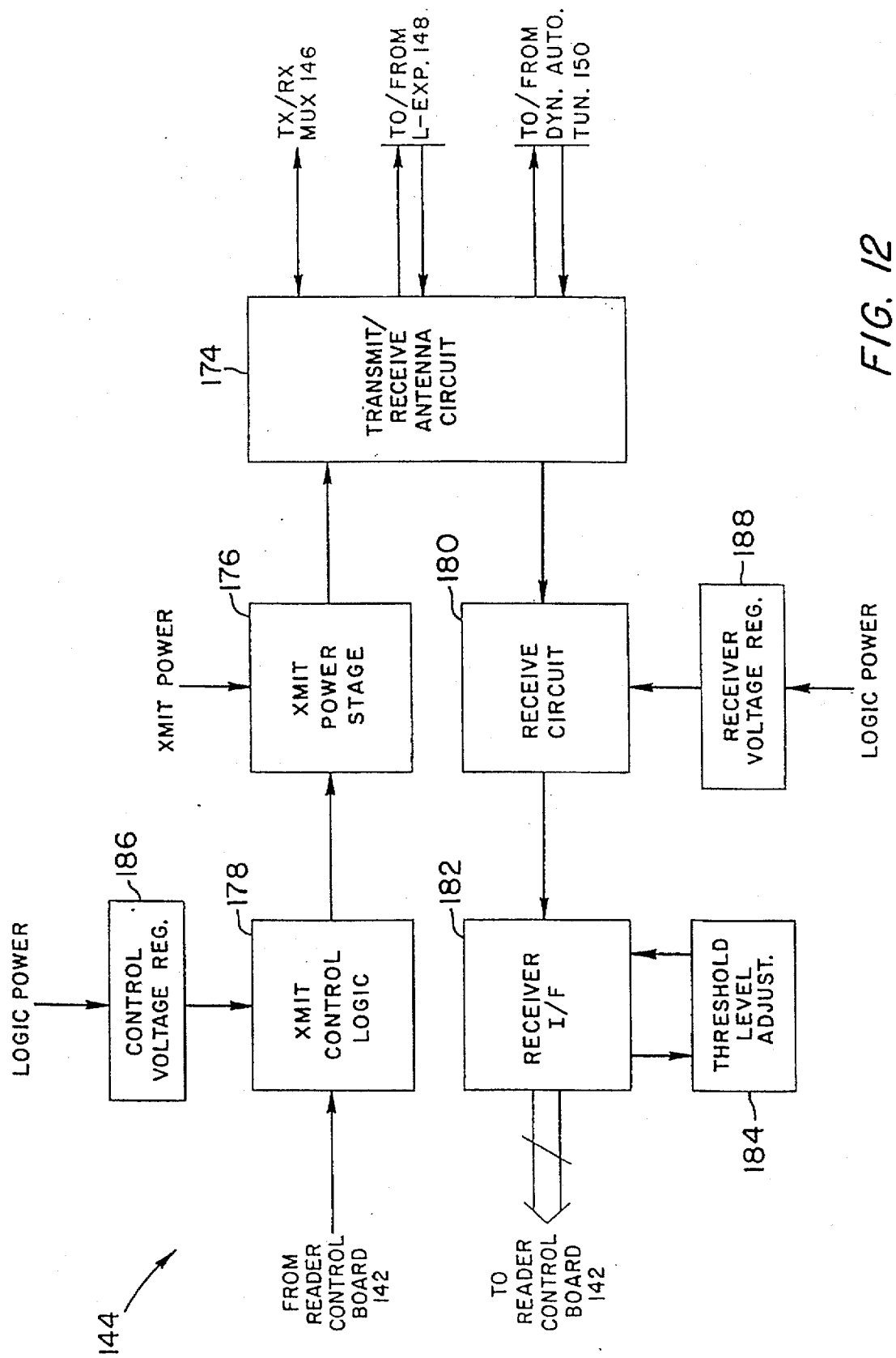
FIG. 12 is a block diagram of a radio frequency module that is part of the reader of FIG. 10.

Additional details concerning the reader 56 will now be provided with reference to FIGS. 10, 11, and 12.

Referring initially to FIG. 10, the major components of the reader 56 are a controller board 142, a radio frequency module 144, a transmit/receive multiplexer block 146, an inductance expansion board 148 and a dynamic auto-tuning module 150.

The controller board 142 exchanges data with the local control module 60 (FIG. 1), and also provides command signals for the other portal devices 58 referred to in connection with FIG. 1. In addition, or alternatively, the controller board 142 may exchange data with other portal devices 58.

Continuing to refer to FIG. 10, the reader controller board 142 also controls RF module 144 to cause the module 144 to generate analog signals to be transmitted from the antennas 52. Further, the controller board 142 receives from the RF module 144 data indicative of analog signals received at the RF module 144 via the portal antennas 52. Further, the reader controller board 142 provides signals for controlling the state of the transmit/receive multiplexer board 146. (Additional details of the reader controller board will be provided below.)

The RF module 144, under control of the controller board 142, generates analog signals to be transmitted via the portal antennas 52. These signals include, in a preferred embodiment, an interrogation signal which causes any marker 54 (FIG. 1) present within the field generated by the antennas 52 to respond by transmitting a marker signal. According to an alternative embodiment, and if the marker 54 is of a type which is capable of receiving programming signals, then the RF module 144 may also be controlled to generate such programming signals. In addition, the RF module 144 receives the marker signal via the antennas 52 and provides to the controller board 142 a receiver clock and serial data corresponding to the received marker signal.

Transmission and reception through the portal antennas 52 is preferably carried out in a time-division multiplexed fashion so that each of the four passage antennas (see FIG. 2) making up the antenna configuration 52 is active in a repeated sequence. The time-division multiplexing is performed by means of the transmit/receive multiplexer board 146, which is provided between the RF module 144 and the antennas 52. Thus, under control of a signal provided from the controller board 142, the transmit/receive multiplexer 146 selectively connects the RF module 144 to each of the four passage antennas in turn.

The L-expansion board 148 and the dynamic auto-tuning module 150 are associated with the RF module 144. The L-expansion board 148 is provided in accordance with a conventional technique so that the reader 56 may optionally be provided at some distance (on the order of up to 300 ft.) from the antenna configuration 52. As will be understood by those of ordinary skill on the art, the L-expansion board 148 accommodates the reader 56 to variations in length of the cable connecting the reader 56 to the antennas 52 by providing an expanded range of inductance, with appropriate variable resistance, so that a desired resonant frequency can be attained in the RF module 144.

The dynamic auto-tuning block 150 provides variable circuit elements by which each of the passage antennas is dynamically maintained in a correct tuning condition at times during which the antennas are inactive (e.g., immediately before the antenna's turn to transmit and receive). The dynamic auto-tuning block 150 employs techniques which are known to those of ordinary skill on the art and is provided to overcome drift and the like, as well as the varying environments in which the antennas may be installed. For example, the antenna characteristics may vary depending on whether a nearby door frame is made of metal or wood.

Additional details regarding the reader controller board 142 will now be provided with reference to FIG. 11.

The controller board 142 includes a conventional microcontroller 152 (for example, a model 80C320 microcontroller available from Dallas Semiconductor Corp., Dallas, Tex.). Connected to the microcontroller 152 are input devices 154, such as switches or the like, used for providing various control and calibration settings. Conventional power conditioning and electromagnetic interference suppression circuitry 156 is also associated with the microcontroller 152 to provide appropriate power supplies for the controller board 142.

The microcontroller 152 is also connected to a peripheral interface decoder 158, which routes data and control signals between the microcontroller 152 and various input/output and peripheral devices. In particular, the routing provided by the decoder 158 relates to the RF module 144 (FIG. 10), the transmit/receive multiplexer board 146 (FIG. 10), a Weigand encoding unit 160 (FIG. 11), an RS232 interface 162, an RS485 interface 164, a relay driver and interface 166, an LED driver and interface 168, a piezo driver and interface 170, and an RS422 interface 172..

The Weigand encoding unit 160 encodes data output from the controller 152 into the well known Weigand format, which is commonly used with card reader access control systems, and transmits the encoded data to the local control module 60. Preferably, the Weigand unit 160 provides four outgoing channels, which may be allocated in a number of ways. For example, each of the four channels may be used to transmit data received via a respective one of the four passage antennas included in each antenna configuration, which would enable the associated local control module 60 to perform the direction detecting operation described below in connection with FIGS. 19A–19C. Alternatively, some or all of the Weigand channels can be shared, say by two or four passage antennas apiece, in which case a single reader unit 56 could be used to control more than one portal antenna installation.

The RS232 and RS485 interfaces (blocks 162 and 164) are provided for data communication with other devices such as the biometric unit 100 (FIG. 4). Alternatively, one or both of the interfaces 162 and 164 may be used for data transfer to the local control module 60 in the event that the module 60 accepts data in formats other than the Weigand format.

The relay interface and driver 166 is provided to control devices such as the above-mentioned remotely-controllable electro-mechanical door lock, status sensor devices, and the like. The driver 166 may, for example, control as many as four or eight relays.

The LED interface and driver 168, based on control signals from the microcontroller 152, selectively provides constant current to illuminate LEDs (102 in FIG. 4 or 124 in FIG. 6). The piezo interface and driver 170 is provided to selectively actuate devices such as beeping units or audible alarm units (not shown).

In addition, the RS422 interface 172 is provided for communication of synchronizing signals used to control the timing of transmissions of interrogation signals by the reader 56. Synchronization of interrogation signals among plural antenna installations may be required when the antenna installations are relatively close to each other, say within 20 feet. In such cases, if the interrogation signals transmitted by one antenna installation were to coincide in time with a marker signal transmitted in response to another antenna signal, the marker signal might be jammed by the coinciding nearby interrogation signal. However, if all nearby antenna configurations transmit their respective interrogation signals simultaneously, interference with neighboring marker signals can be avoided. (More details of the interrogation signal and marker Signal response cycle are given below in connection with FIG. 15.)

According to a preferred technique for synchronizing a group of readers 56 (which may be all of the readers in the system 50), one of the readers is designated a master device and transmits a synchronizing signal at regular intervals. The synchronizing signal is transmitted in daisy-chain fashion, and with minimal delay, from one reader to another, so that all of the readers to be synchronized receive the sync signal. If the master unit experiences a failure condition which causes the master unit to cease transmitting the sync signal, another reader detects this fact and takes over as the master unit.

Additional details concerning the RF module 144 will now be provided with reference to FIG. 12. The RF module 144 includes a transmit/receive antenna circuit 174 which is connected via the transmit/receive multiplexer board 146 to the above-described passage antennas. The antenna circuit 174 functions to generate a transmit signal which drives the currently active passage antenna to radiate an interrogation signal and, if appropriate, a marker programming signal. At other times the circuit 174 functions to receive a marker signal through the passage antenna currently selected by the multiplexer board 146. The above-mentioned L-expansion board 148 and dynamic auto-tuning block 150 are associated with the antenna 174 in a preferred embodiment of the invention. However, in other embodiments one or both of the L-expansion board 148 and the auto-tuning block 150 may be omitted, in favor of tuning adjustments made upon installation of the antennas. Such adjustments may include applying jumper cables and the like at appropriate terminals (not separately shown) of the antenna circuit 174.

Power for the transmit signal generated in the antenna circuit 174 is provided by transmit power stage 176, which operates under the control of transmit control logic 178. The transmit control logic 178, in turn, is subject to control from the controller board 142. Marker signals received via the antenna circuit 174 are filtered and converted to digital form at receive circuit 180 and provided to the controller board 142 along with a data clock signal by way of a receiver interface 182. A threshold level adjustment circuit 184 is associated with the receiver interface 182 to allow manual adjustment of a threshold level used to distinguish between "high" and "low" bit levels. Regulated power for the transmit control logic 178 and the receive circuit 180 is provided, respectively, through control voltage regulator 186 and receiver voltage regulator 188.

Transponder

Figure 13:
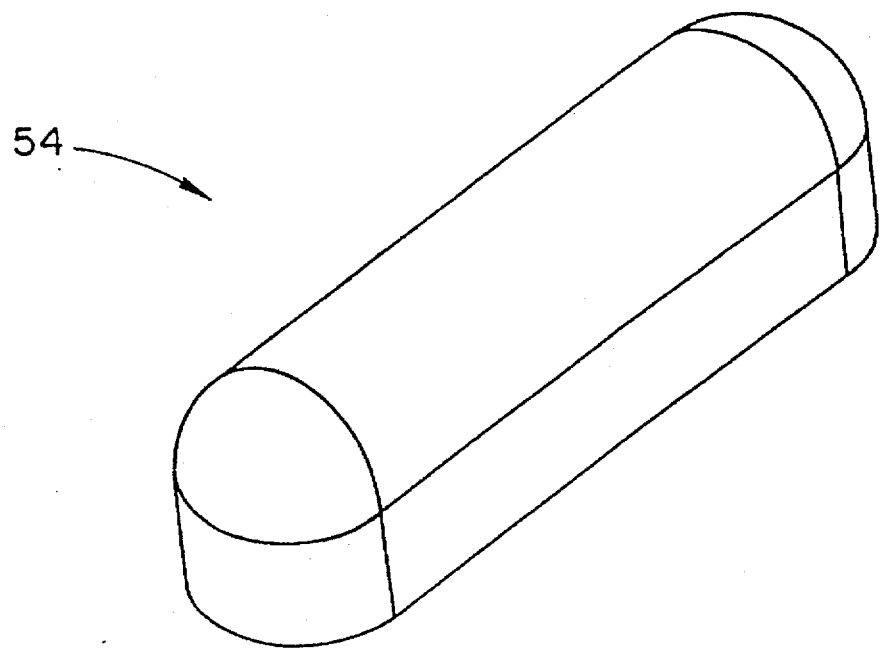
FIG. 13 is a perspective view of a transponder that may be used as an object marker in connection with the asset tracking system of FIG. 1.

FIG. 13 is a perspective view of a transponder that may be used as a marker 54 in the asset control system 50 of FIG. 1. The transponder may be secured to assets to be tracked by the system 50 by any convenient method, including attachment by adhesive. The transponder shown in FIG. 13 is, according to a preferred embodiment, of the type provided by Texas Instruments in connection with its "TIRIS" automatic identification system. Since the preferred marker 54 is a conventional device, the same will be described only briefly with reference to FIG. 14. The preferred marker 54 includes a receive/transmit coil 190, a power storage circuit 192, a control circuit 194 and a transmit circuit 196. A tuning circuit 198 is associated with the receive/transmit coil 190. The tuning circuit 198 may include, for example, a capacitor having a value selected so that the receive/transmit coil 190 has a predetermined resonant frequency. When the marker 54 is the above-mentioned transponder for attachment to an asset to be tracked, the receive/transmit coil 190 preferably takes the form of a ferrite rod with an antenna coil wrapped around the ferrite rod. Alternatively, the receive/transmit coil 190 may be a flat circular or elliptical coil so that the entire marker 54 may be embodied in a conventionally-shaped employee badge, which is approximately the size and shape of a credit card.

A non-volatile memory 200 is associated with the control circuit 194. The NVM 200, which may be an EPROM for instance, stores software for controlling the control circuit 194 and also stores data such as a unique identification code for the marker Assuming that the marker 54 is of the type which is capable of receiving programming or instruction signals, then the marker also includes a receiver circuit 202 which receives signals via the receive/transmit coil 190 and conditions the signals to provide conditioned input data to the control circuit 194.

Operation of the marker 54 will now be briefly described with reference to FIG. 15 in addition to FIG. 14. From a time T1 to a time T2 an interrogation signal is transmitted by a particular one of the passage antennas under control of the reader 56. The interrogation signal is a power burst (at 134.2 kHz for example) that has a duration of about 48 ms and is received by the receive/transmit coil 190 of the marker 54 to charge up the power storage circuit 192. The power storage circuit 192 may include, for example, a power storage capacitor. At time T2, which represents the end of the 48 ms power burst, the power storage circuit 192 provides power for the control circuit 194, the transmit circuit 196 and the receive circuit 202 (assuming that the power signal received at the marker 54 was of sufficient amplitude to charge the storage circuit 192 above a threshold). Next, during a period from time T2 to time T3 (which may have a duration of 35 ms), the control circuit 194 drives the transmit circuit 196 to send a marker identification signal through the transmit/receive coil 190. It will be understood that the identification signal includes data which reflects the unique marker identification code stored in the non-volatile memory 200. At the end of the transmission period (i.e. at time T3), the power storage circuit 192 is discharged by, for example, shorting the storage capacitor. The next interrogation/marker transmission cycle commences with time T4, which may be delayed by up to 70 ms after time T3 to permit the reader 56 to receive and process the data transmitted by the marker during the period from T2 to T3. Alternatively, the reader may be arranged to receive and process the receive marker signal in parallel with the next interrogation signal, in which case times T3 and T4 may coincide.

It should be noted that the marker can be provided with a battery instead of the power storage system 192, in which case the interrogation signal provided by the system 50 would not need to be a power burst signal.

Figure 15:
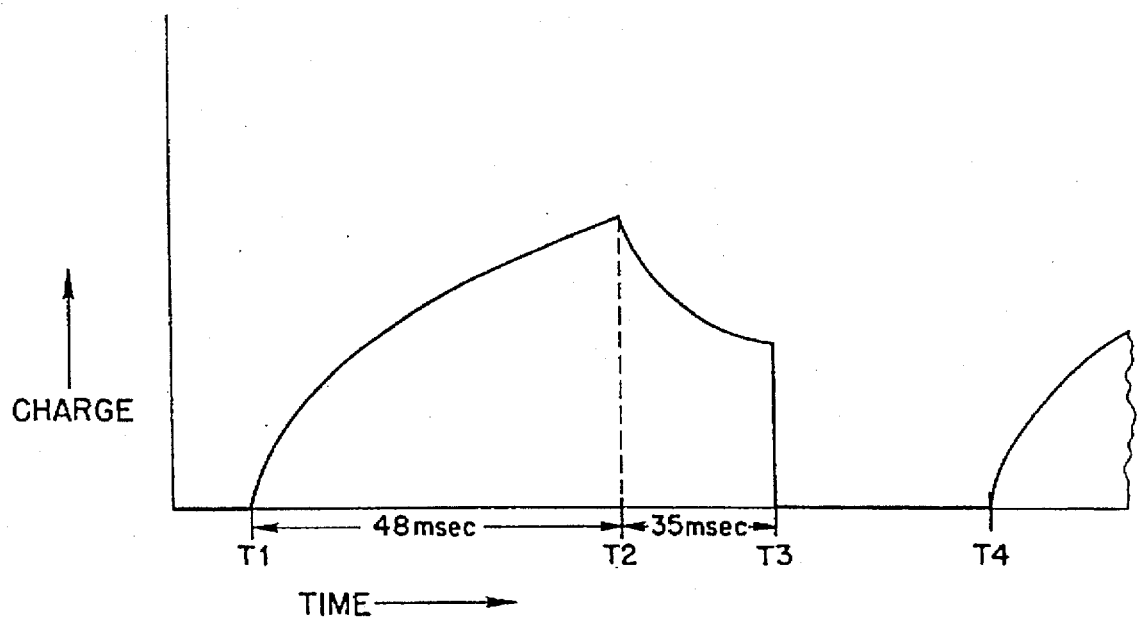
FIG. 15 is a waveform diagram which illustrates an interrogation and response cycle of the transponder of FIG. 13.

According to an alternative manner of practicing the invention, the interrogation signal illustrated in FIG. 15 may be modulated in some manner so as to provide an interrogation data signal or programming signal to the marker 54. In response to information in the interrogation data signal, the marker operates to select and transmit from among a plurality of different sets of data (referred to as "pages"). One of the pages is preferably the unique marker identification code. Other pages may include, for example, information concerning the object to which the marker is attached such as manufacturer, model number, serial number and so forth, or a history of the object's movements. For the purpose of recording the latter type of information, marker 54 may be arranged to store in the memory 200 information transmitted to the marker via the interrogation data signal.

Directional Characteristics of Antenna Configuration

Having briefly described the marker 54 and the cycle by which the marker is interrogated by the reader 56 and transmits the marker signal to the reader 56, there will now be described with reference to FIGS. 7–9 certain characteristics of the field generated by the portal antenna configuration 52 which is used to interrogate the marker 54 and receive the marker signal from the marker 54.

Figure 7:
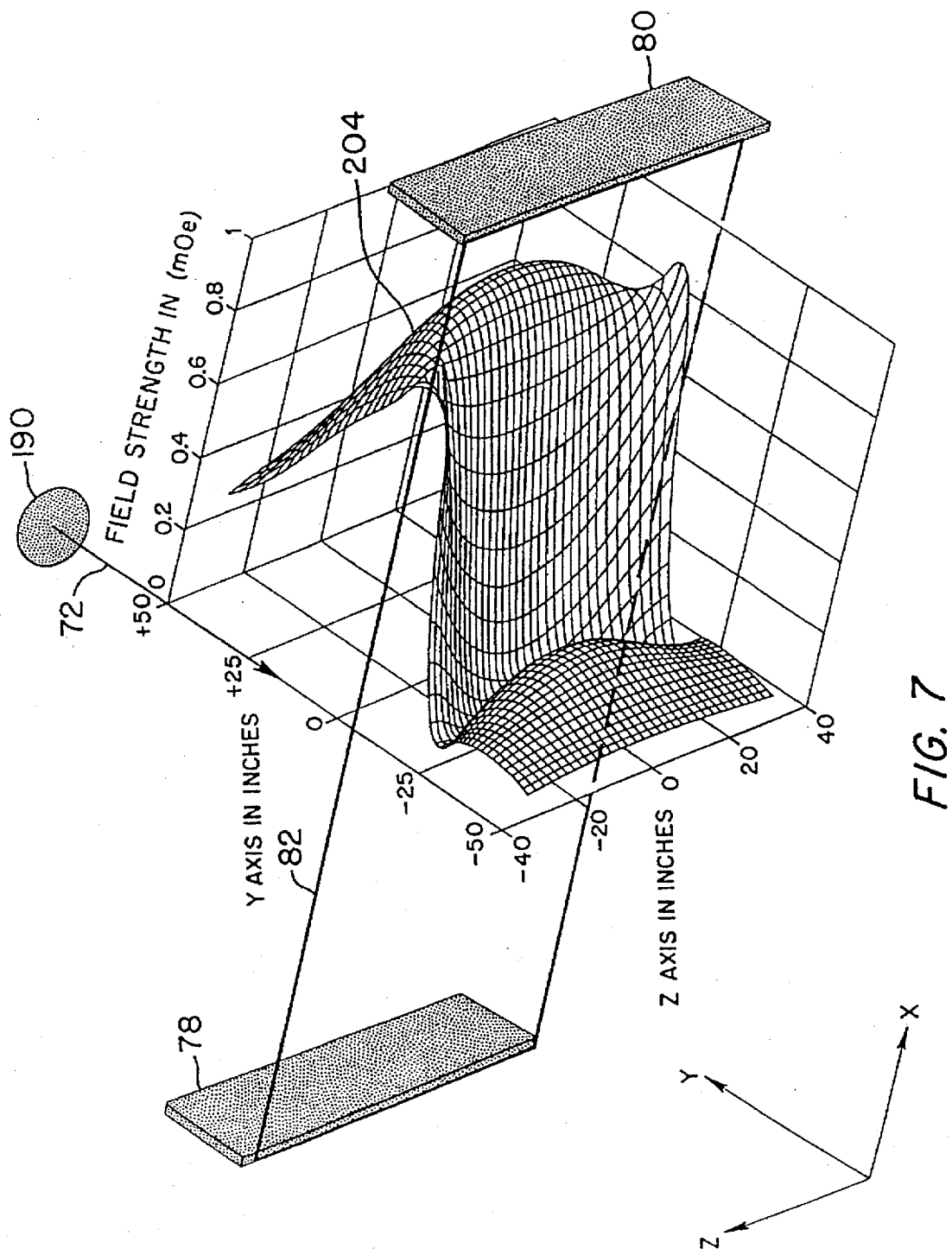
FIG. 7 is a schematic illustration of an antenna configuration in accordance the invention, combined with a graph indicative of effective signal field strength at various points relative to the antenna configuration.
Figure 8:
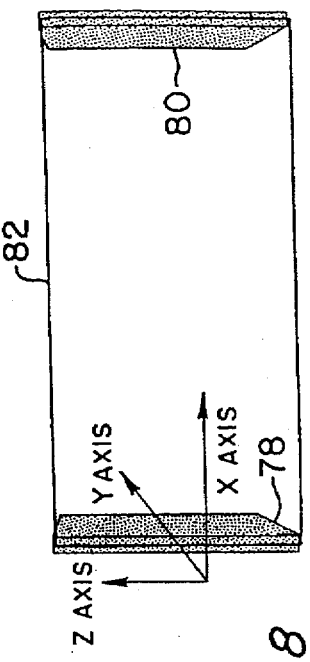
FIG. 8 is another schematic view of the antenna configuration of FIG. 7.

Referring initially to FIG. 8, the portion of the antenna configuration 52 provided on one side of a doorway is portrayed in a view looking outward from the doorway. In particular, FIGS. 7 and 8 are indicative of an antenna configuration for a relatively wide doorway, i.e. as much as 6 feet wide. As before, the shorted loop 82 circumscribes the doorway, and a path of travel through the doorway is bracketed by the passage antennas 78 and 80. For the purposes of FIGS. 7–9, the Y axis is defined in the direction of the path of travel through the doorway, the Z axis is defined as being in the vertical direction, and the X axis is defined as being in the horizontal direction perpendicular to the path of travel. Also, the zero point on the Y axis is defined as the point at which the plane of the shorted loop 82 intersects with the Y axis (it being noted that the plane of the shorted loop 82 is normal to the Y axis), the zero point on the Z axis is defined as being halfway between the top and the bottom of the doorway (that is, halfway between the upper and lower horizontal segments of the shorted loop 82), and the zero point on the X axis is defined as being at one of the passage antennas, i.e., passage antenna 78.

A "wire-mesh" drawing surface 204 in FIG. 7 graphically represents the strength of the interrogation signal radiated by one of the passage antennas 78 and 80, as received by the marker receiving coil 190 when the coil is oriented so as to be in a plane that is parallel to the plane of the shorted loop 82, as a function of position in the Y and Z directions, with respect to a central position in the path of travel 72 (i.e., for X=36 in. for a 6-foot wide doorway). Essentially the same information as in FIG. 7 is presented in a different form in FIG. 9. The several curves shown in FIG. 9 represent different positions along the Z axis, and each curve being a graph of field strength of the signal (as received by the coil 190 in the orientation as previously described) versus position along the Y axis. The dotted line 206 in FIG. 9 represents a field strength required for the marker to be charged sufficiently to respond by transmitting a marker signal. FIG. 9 indicates that, essentially regardless of the height at which the marker passes through the doorway, the area in which the interrogation signal is strong enough to activate the marker is substantially confined to one side (the outside) of the doorway. This confinement of the effective field of the interrogation signal to the area outside the doorway is due to a coupling effect between the shorted loop 82 and the active passage antenna. As will be seen, this confinement of the interrogation signal field to one side of the doorway aids in determining the direction in which a marker is moved through the doorway and whether the marker is actually moved all the way through the doorway. Also, the provision of the shorted loop 82 in a plane that is perpendicular to the plane of orientation of the passage antennas helps to eliminate dead spots that would otherwise be present between the passage antennas when the same are on opposite sides of a relatively wide doorway.

Figure 9:
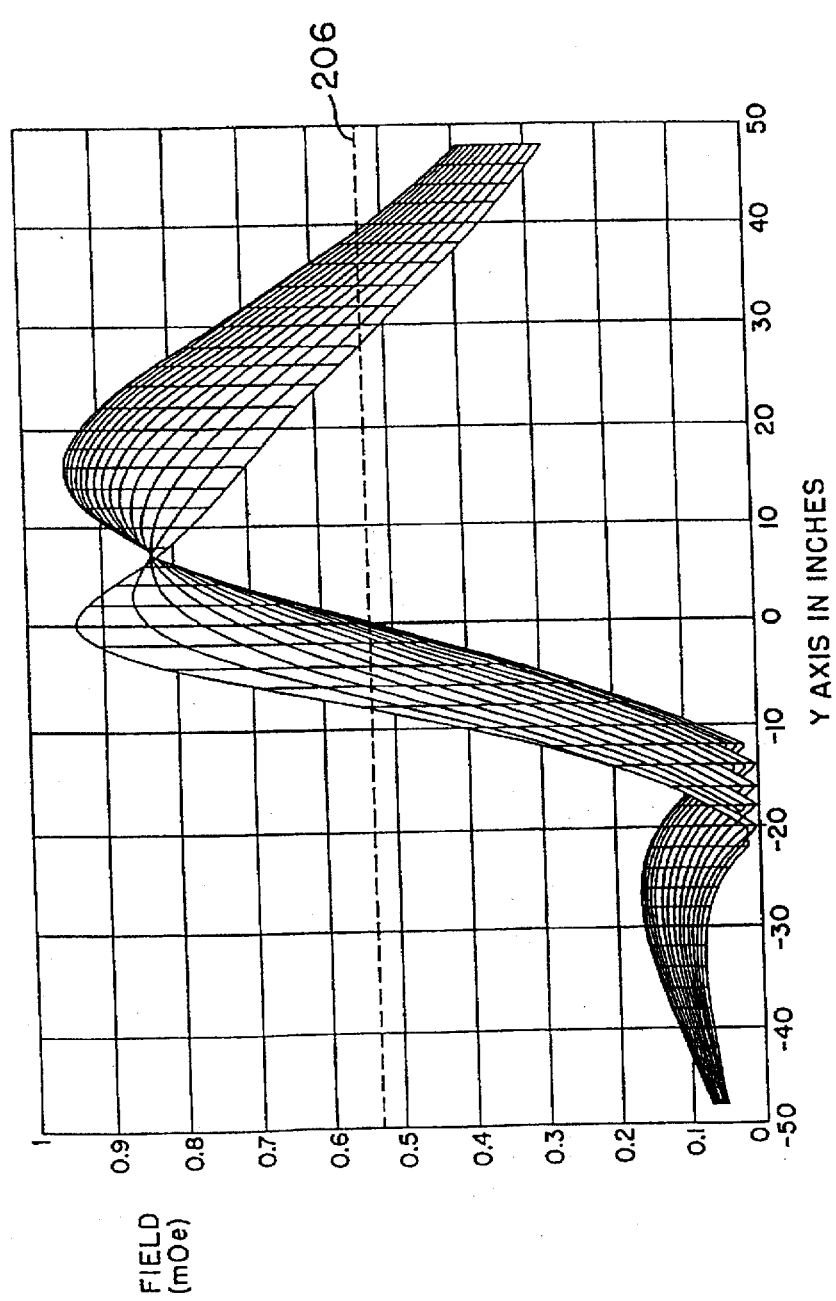
FIG. 9 is another graphical illustration of signal field strength at various points relative to the antenna configuration of FIG. 7.

Substantially the same field distribution shown in FIGS. 7 and 9 can be obtained by replacing each of the shorted loops 82, 82' of the antenna configuration 52 (FIGS. 2) by a respective tunable loop that is tuned so as to be resonant at the frequency of the interrogation signal. Alternatively, the tunable loop can be tuned so as to be on the inductive side of resonance with respect to the interrogation signal frequency.

As still another alternative, the tunable loop can be switched back and forth between the inductive side of resonance and the capacitive side of resonance with respect to the interrogation signal frequency. When the tunable loop is tuned to be on the inductive side of resonance, the interrogation field is substantially confined to one side of the loop, say the "positive Y" side, as shown in FIGS. 7 and 9. When the tunable loop is tuned to be on the capacitive side of resonance, the interrogation field is substantially confined to the other side of the loop, i.e., the "negative Y" side in FIGS. 7 and 9. Thus switching the tuning of the loop between capacitive and inductive sides of resonance effectively switches the side of the loop to which the interrogation field is confined. As will be discussed below in connection with a procedure for detecting a direction of movement of a marker, provision of a tunable loop which is switchable between capacitive and inductive sides of resonance allows the direction finding procedure to be performed even with an antenna configuration which includes only one such tunable loop and two passage antennas, rather than two shorted loops and four passage antennas as in FIG. 2. Thus, if such a tunable loop is provided, a direction finding operation can be performed using only the stand-alone antenna assembly shown in FIG. 4.

Movement Tracking Zones

Subsequent discussion of access and asset control operations of the system 50 will be made with reference to FIG. 3, which presents a simplified layout of control zones 1, 2 and 3 as shown on a building floor plan 208. It will be noted from FIG. 3 that antenna installations 52-1, 52-2, 52-3 and 52-4 are provided in association with respective doorways or portals in the floor plan 208. (Components of the system such as readers, local control panels and the host computer are omitted from FIG. 3 for the sake of simplifying the drawing.) It is preferred that each of these antenna installations have the configuration shown in FIG. 2. It will be noted that each of the antennas 52-1, 52-2 and 52-3 is provided at respective points on a boundary of zone 1, which is indicated by diagonal shading. Moreover, antenna installations 52-3 and 52-4 are provided at respective points on the boundary of control zone 2, which is indicated by cross-hatched shading. The antenna installation 52-4 is also on the boundary of zone 3, which is shown as being an enclosure entered from zone 2. From the foregoing, it will be understood that antenna installation 52-3 is at a point on the common boundary of zones 1 and 2 and that the installation 52-4 is at a point on the common boundary of zones 2 and 3.

Figure 3:
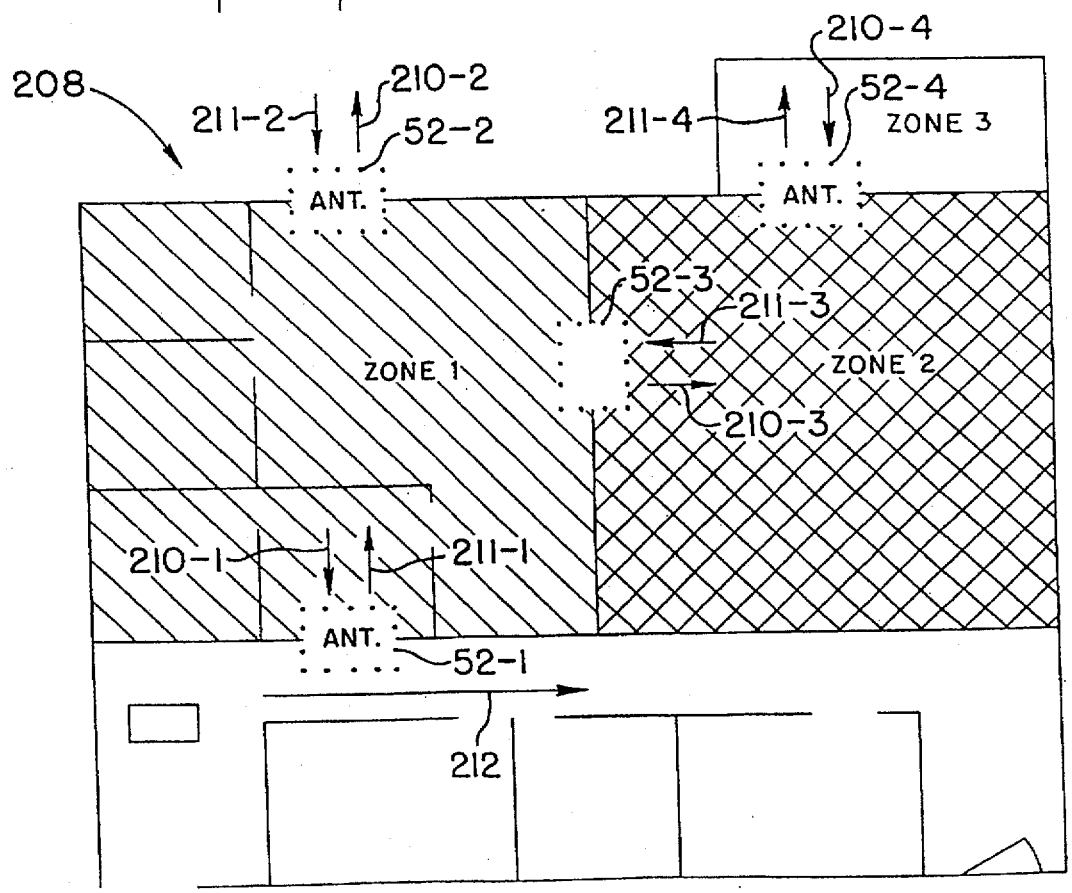
FIG. 3 is a schematic floor plan of a building having several asset control zones.

Each of the antenna installations shown in FIG. 3 has two opposite directions of travel or movement defined in reference to the doorway at which the antennas are installed. In particular, with respect to antenna installation 52-1, arrow 210-1 is indicative of movement through the associated portal and out of zone 1 while arrow 211-1 is indicative of movement through that portal and into zone 1. Similarly, arrow 210-2 is indicative of a direction of movement or passage out of zone 1 via the portal associated with antenna installation 52-2, and arrow 211-2 is indicative of movement in the opposite direction through that portal, i.e. into zone 1. Further, arrow 210-3 indicates a direction of movement through the portal associated with antenna installation 52-3 and out of zone 1, while arrow 211-3 indicates the opposite direction of movement through the portal, which is into zone 1. At the same time, the direction of movement indicated by arrow 210-3 is further defined as being into zone 2 while the direction of movement indicated by arrow 211-3 is defined as being out of zone 2.

Still further, the direction of movement through the portal associated with antenna installation 52-4 as indicated by arrow 210-4 is defined as being into zone 2, and the opposite direction of movement, indicated by arrow 211-4, is defined as being movement out of zone 2 through the portal associated with antenna installation 52-4. Finally, the directions of movement indicated by the arrows 210-4 and 211-4 are defined as respectively movements out of and into zone 3.

Although not shown in FIG. 3, the zone arrangement may include nested zones, i.e., two zones such that a first zone is entirely surrounded by a second zone. In such a case, any movement out of the first zone would constitute movement into the second zone.

Access Control Operation

Operation of the system 50 for the purpose of access control will now be described with reference to FIGS. 16A and 16B, which depict the operation in the form of a flow chart.

Figure 16A:
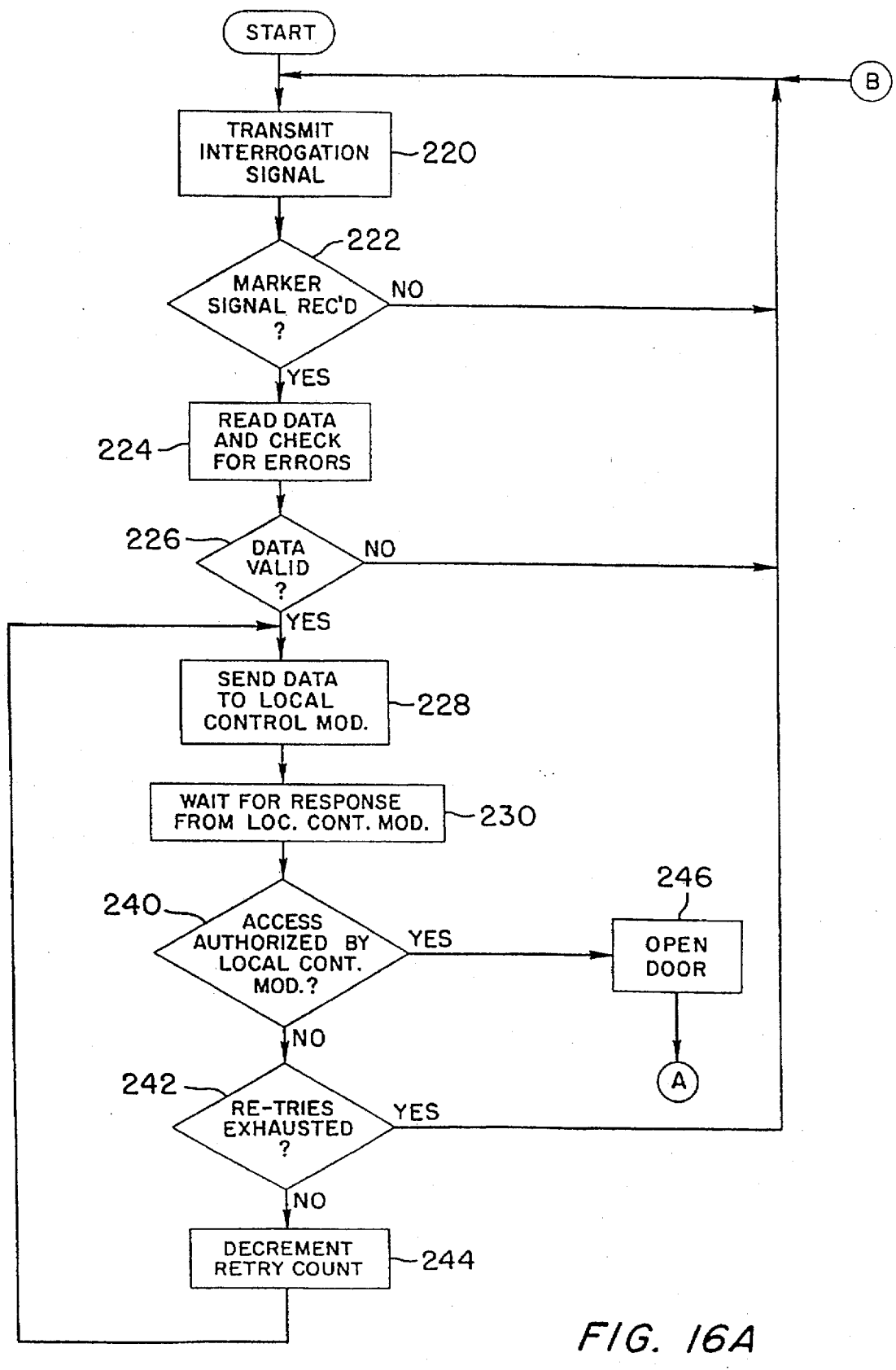
FIGS. 16A and 16B together form a flow chart which illustrates a manner of operating the system of FIG. 1 to carry out an access control function.
Figure 16B:
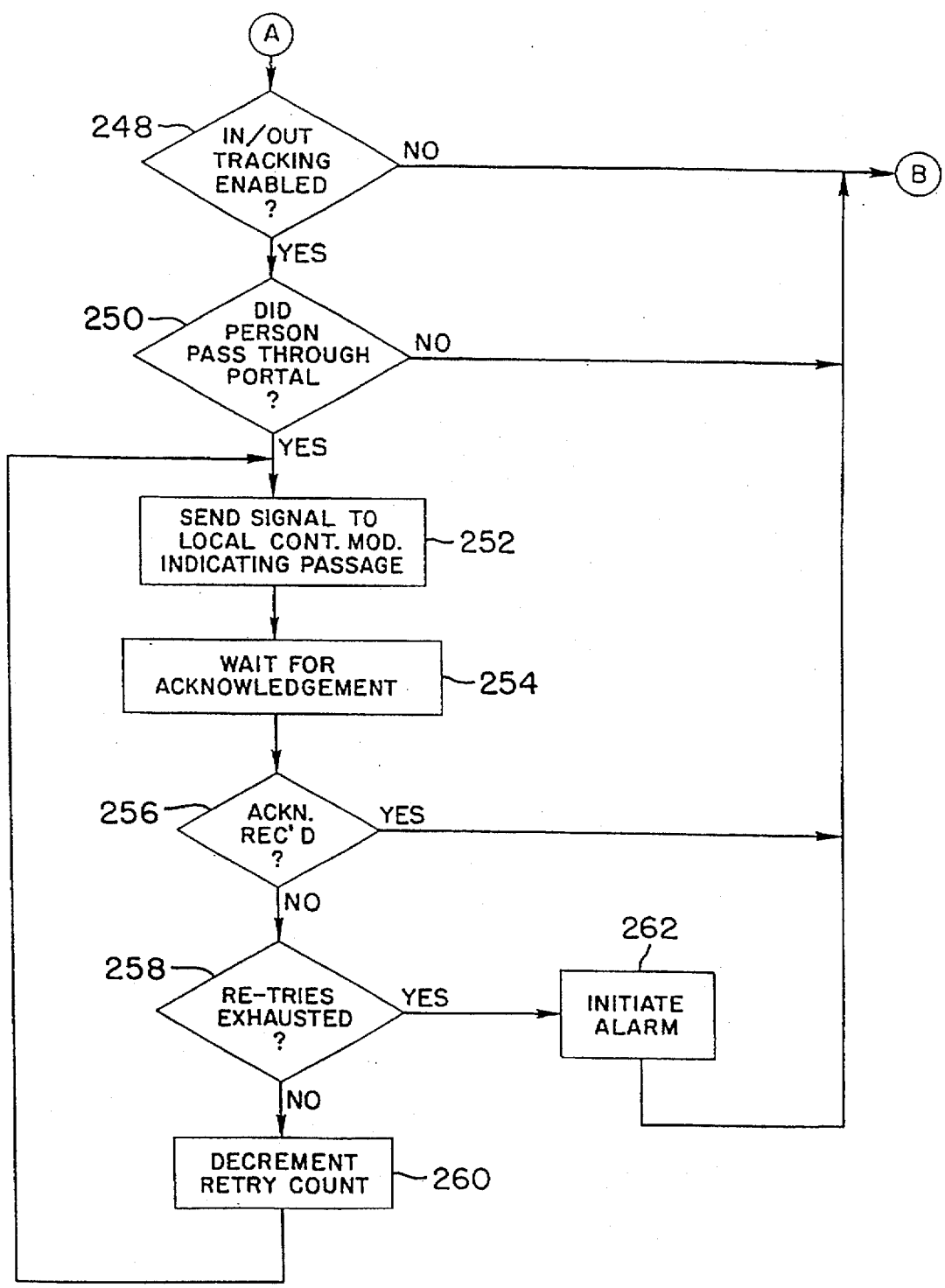

The operation of FIGS. 16A and 16B begins with step 220, at which a reader 56 associated with a particular doorway causes one of the four passage antennas associated with the doorway to transmit a marker interrogation signal. Next it is determined, at step 222, whether a marker signal has been received in response to the interrogation signal transmitted at step 220. If not, the operation loops back to step 220. Otherwise, i.e., if a marker signal is received, the reader 224 reads the data contained in the marker signal and determines based on a parity code or the like whether there are errors in the data (step 224). Step 226 indicates a decision block as to whether the data is in valid form or not. If not, the operation loops back to step 220. Otherwise, the operation proceeds to step 228, at which the reader 56 transfers the data from the marker signal to its associated local control module 60. The reader 56 then waits for a response from the local control module (step 230).

Following step 230 is step 240, at which it is determined whether a signal authorizing access is received from the local control module 60. If the access authorization signal is not received within a predetermined period of time, the reader 56 next determines whether a predetermined number of transmissions of the data has occurred (step 242). If not, a re-try count is decremented (step 244), and the operation loops back to step 228, so that the data from the marker signal is sent again to the local control module 60. It will be noted that the operation will loop through steps 228 through 244 until the predetermined number of retries tries has been exhausted, in which case the operation will loop back to step 220 from step 242.

Returning for further consideration of step 240, if it is found at that step that an access authorization signal has been received from the local control module 60, then the reader 56 sends an appropriate control signal to unlock a door provided in the portal controlled by the reader 56 (step 246). It is to be understood that the local control module 60 will not issue the access authorization signal unless the data transmitted to the control module 60 by the reader 56 matches an identification signal stored in the database in control module 60 and corresponding to the identification badge for a person who is authorized to pass through the portal controlled by the reader 56.

Following step 246 is step 248 (FIG. 16B) at which it is determined whether records are to be maintained of individuals permitted access through the door associated with reader 56. If not, the operation loops back to step 220. However, if records are to be maintained of persons receiving access, then step 250 follows step 248. At step 250, it is determined whether the person associated with the marker did in fact pass through the associated portal. This may be accomplished by transmitting interrogation signals and attempting to receive a marker signal via passage antennas on the opposite side of the portal from the passage antenna used at step 220 for transmitting the interrogation signal which resulted in the marker signal received at step 222. If interrogation on the opposite side of the portal is found to be unsuccessful, then it is concluded that the person did not in fact pass through the portal. This could occur for example, if a person authorized to enter zone 1 (FIG. 3) were to walk along the corridor as indicated by arrow 212, close to, but without attempting to pass through, the portal associated with antenna installation 52-1. On the other hand, if the person does pass through the portal, then the marker (badge) carried by the person, when interrogated on the opposite side of the portal, will transmit the marker signal again, which will be detected to indicate that the person passed through the portal. In this case, step 252 (FIG. 16B) follows step 250. At step 252, the reader 56 sends a signal to the local control module 60 indicating that the person passed through the portal. The reader 56 then waits (step 254) for a signal from the control module 60 to acknowledge the signal sent at step 252.

At step 256, it is determined whether the acknowledgment signal is received. If so, the operation returns to step 220. Otherwise there follows step 258, at which it is determined whether the signal confirming passage has been sent a predetermined number of times. If not, a re-try count is decremented (step 260) and the operation returns to step 252. However, if the predetermined number of re-tries is exhausted, then, step 262 follows step 258. At step 262, the reader initiates an alarm condition, or takes other action to indicate that the local control module 60 ms not operating properly to record the identities of persons passing through the portal controlled by reader 56. The operation then returns from step 262 back to step 220.

It should be understood that each reiteration of step 220 may be performed using a passage antenna that is different from the passage antenna used on the immediately preceding reiteration of step 220. For example, the interrogation signal may be transmitted by alternating between the two passage antennas on one side of the portal, if, for example, passage through the portal is only controlled in one direction. As another alternative, if passage through the portal is controlled in both directions, sequential iterations of step 220 may be performed using each of the four passage antennas in a repeating sequence. Also, when conditions result in initiation of an alarm as in step 262, the operation of FIGS. 16A and 16B may be suspended, rather than continuing to permit access by authorized personnel.

Asset Tracking Operation

Figure 17A:
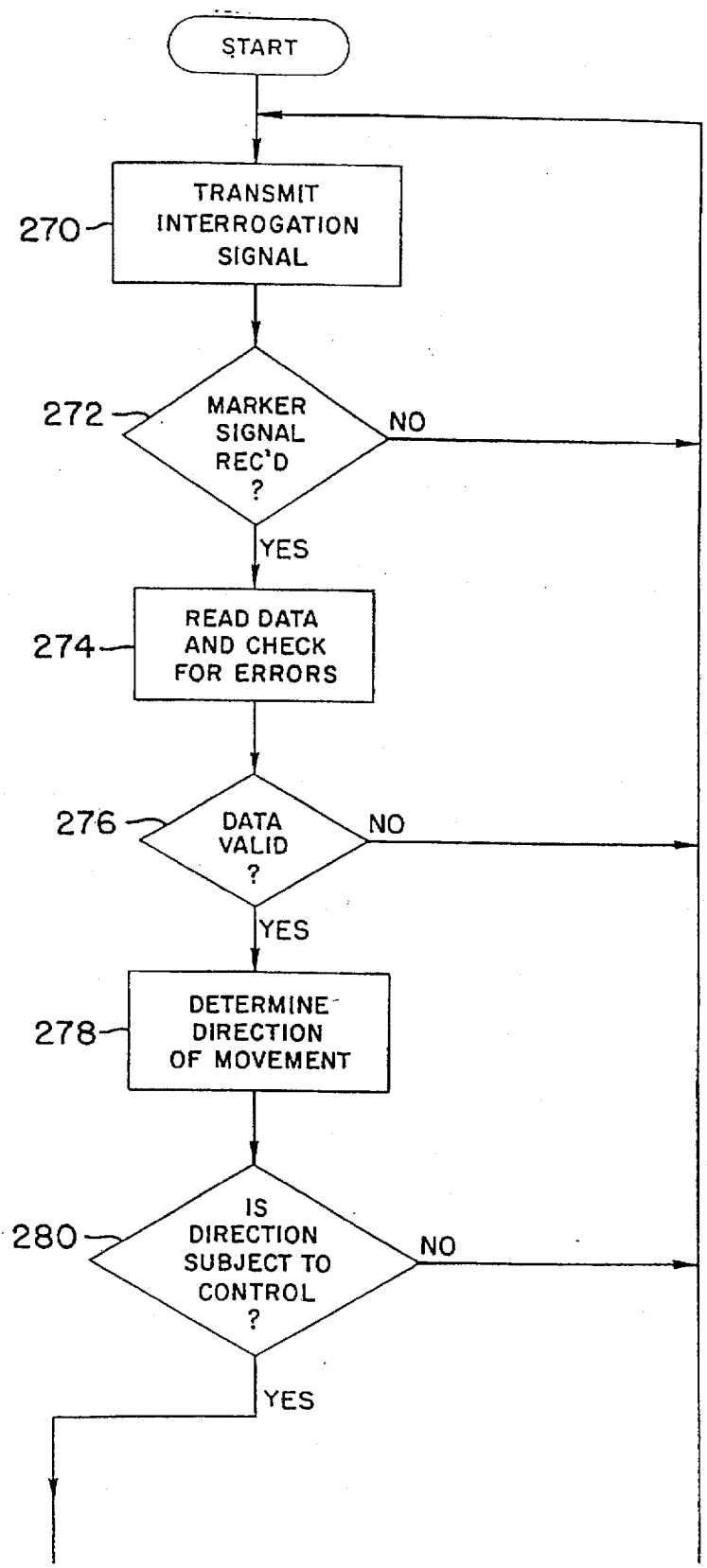
FIGS. 17A and 17B together form is a flow chart which illustrates a manner of operating the system of FIG. 1 to carry out an asset movement control function.
Figure 17B:
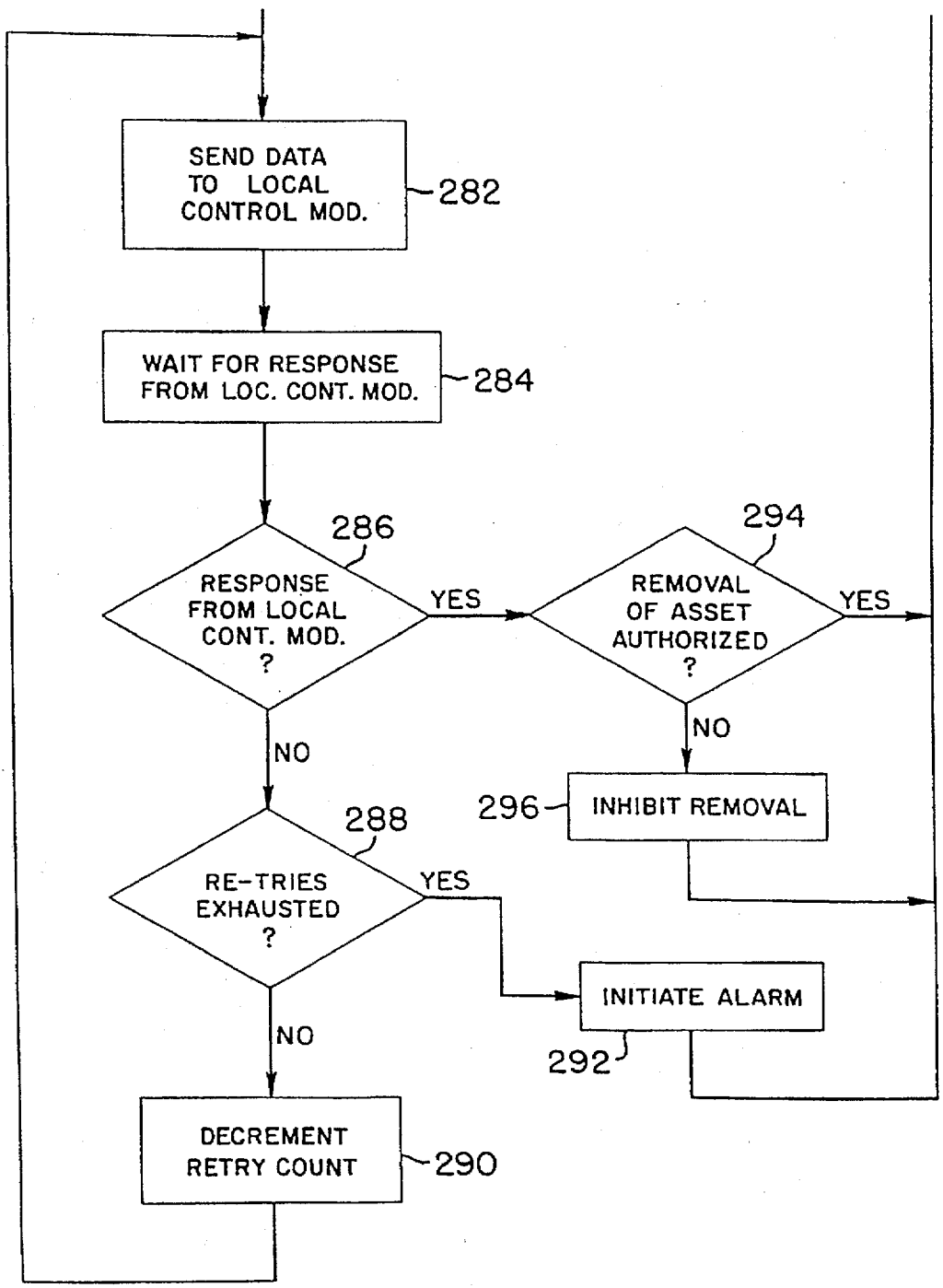

Operation of the system 50.to control and track movement of assets will now be described with reference to FIG. 17A and 17B which represents the operation in the form of a flow chart. For the purposes of the operation of FIG. 17A and 17B it is generally assumed that the received marker signals are generated from a transponder secured to a valuable asset to be tracked by the system 50, rather than an individual to be selectively permitted access through a locked door, as was the case in the operation of FIGS. 16A and 16B.

The first four steps shown in FIG. 17A which are steps 270, 272, 274 and 276 are essentially the same as steps 220–226 of FIG. 16A, and will be described only in summary terms. Continuing to refer to FIG. 17A it is briefly noted that at step 270 an interrogation signal is transmitted, and at step 272 it is determined whether a marker signal is received in response to the interrogation signal. If so, the data provided in the marker signal is checked for errors and it is determined whether the data is valid (steps 274 and 276). If the determination made at either of steps 272 or 276 is in the negative, then the operation loops back to step 270.

If the determination at step 276 is in the affirmative, then step 278 follows step 276. At step 278 it is determined in which direction through the portal the marker (and presumably an object of interest to which the marker is attached) is being moved. For example, and referring to FIG. 3, let it be assumed that the reader in which the operation of FIGS. 17A and 17B is being carried out is associated with antenna installation 52-3, and that there is no door (or at least no remotely-controllable locked door), at the portal associated with antenna installation 52-3. Then the purpose of step 278 is to determine whether the marker is being moved in the direction indicated by arrow 211-3 or in the direction indicated by arrow 210-3. In other words, the purpose of the determination to be made in this case is whether the object is being moved from zone 1 to zone 2 or from zone 2 to zone 1. A procedure for making this determination will be described below in connection with FIGS. 19A, 19B and 19C. For present purposes, it is simply assumed that the determination is made, and that the operation of FIG. 17A continues to step 280, at which it is determined whether the detected direction of movement is subject to control. If not, the operation returns to step 270. For example, if the detected direction of movement is from zone 1 to zone 2, and zone 2 is a central repository for the objects of interest (e.g., a lap-top computer storage room), then there may be no desire to inhibit or control movement of the objects into zone 2.

On the other hand, if the movement was found to be in a direction subject to control, such as removing, or, "checking out" a lap-top computer from the storage room, then step 282 follows step 280. At step 282, the reader 56 sends to its associated local control module 60 the marker identification data provided in the received marker signal. The reader 56 then waits for a response from the control module 60 (step 284). Step 286 follows step 284. At step 286 it is determined whether a response has been received from the control module 60. If not, it is determined at step 288 whether a predetermined number of re-tries has been exhausted, and if not a re-try count is decremented (step 290), and the operation loops back to step 282 so that the marker data is sent again to the control module 60.

On the other hand, if at step 288 it was determined that the predetermined number of re-tries has been exhausted, then step 292 follows step 288. As in step 262 of FIG. 16B, at step 292 an alarm condition is initiated by the reader 56 to indicate that the local control module 60 is not functioning properly. The operation then returns to step 270 from step 292.

Referring again to step 286, if it is determined at that step that a response from the local control module 60 has been received, then step 294 follows step 286. At step 294, it is determined whether the response from the local control module 60 indicates that it is permissible to move the object identified by the marker in the detected direction of movement. If so, the operation returns to step 270. But if the movement of the object in the detected direction is not authorized, then step 296 follows step 294. At step 296, the reader 56 takes some action to inhibit the movement of the object. This action may take the form of actuating a visual and/or audible alarm. Alternatively, the reader may passively inhibit the movement of the object by, for example, failing to actuate a visual indication, or an audible indication, that the movement of the object is authorized. As a further alternative, it may be assumed, contrary to a previous assumption, that the portal with which the reader is associated is controlled by a locked door. In that case, inhibiting removal of the object may take the form of maintaining the door in a locked condition. As still another possibility, a video camera and associated recorder may be operated by the reader or by the local control module to generate and record video signals to capture the image of a person or persons removing the object. If the camera is in a visible position, and is moved to point towards the doorway, the simple act of actuating the camera may aid in inhibiting removal of the object. In any case, the recorded image may be useful in determining which individuals were responsible for removing the object.

After step 296, the operation returns to step 270. As was the case with step 220 of FIG. 16, it is to be understood that sequential iterations of step 270 preferably are carried out with different ones of the passage antennas in accordance with a predetermined sequence or cycle.

Combined Access Control and Asset Tracking Operation

An operation of the system 50 to perform both asset and access control, in addition to keeping track of the locations, from time to time of various assets, will now be described with reference to FIGS. 18A, 18B and 18C. It will be noted that this operation is depicted in the form of a flow chart. For the purposes of this operation, it will be assumed that markers are attached to both individuals and objects, that individuals are to be selectively denied access to portions of the premises, that movement of the objects in certain directions through certain portals is to be selectively inhibited, and that locations of the objects in the premises are to be kept track of in real time.

Figure 18A:
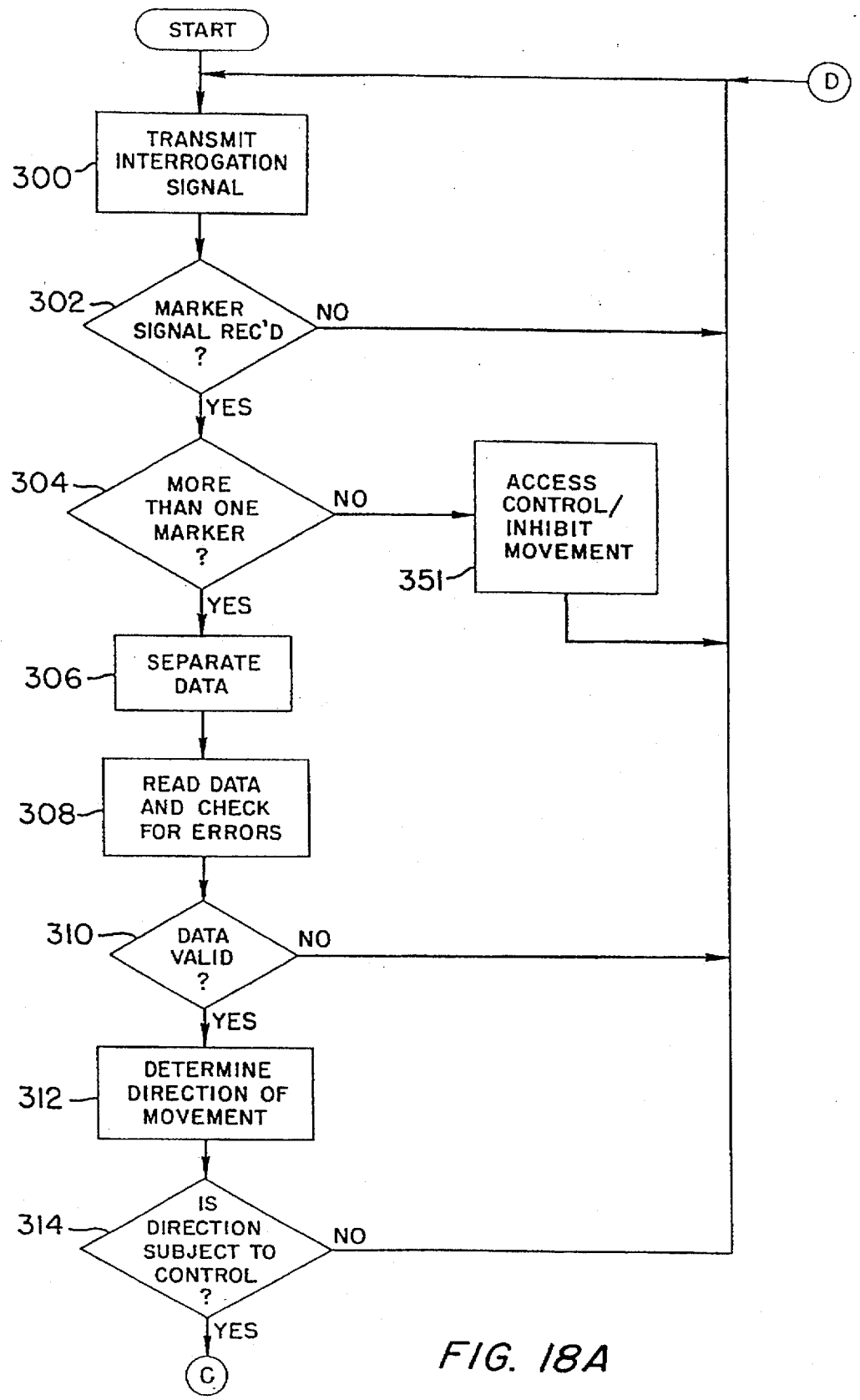
FIGS. 18A, 18B and 18C together form a flow chart which illustrates a manner of operating the system of FIG. 1 to carry out a combined asset and access control and tracking function.
Figure 18B:
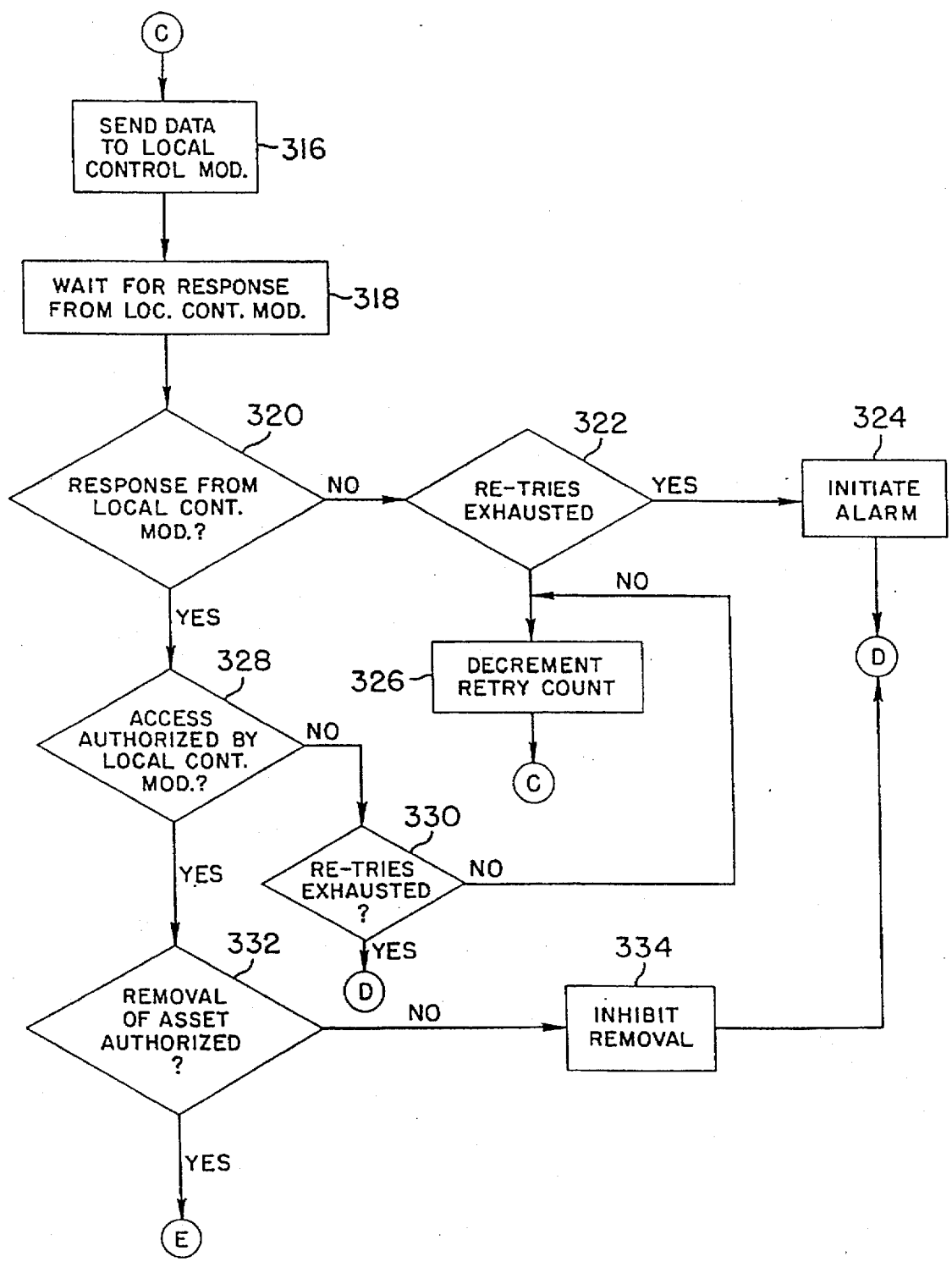
Figure 18C:
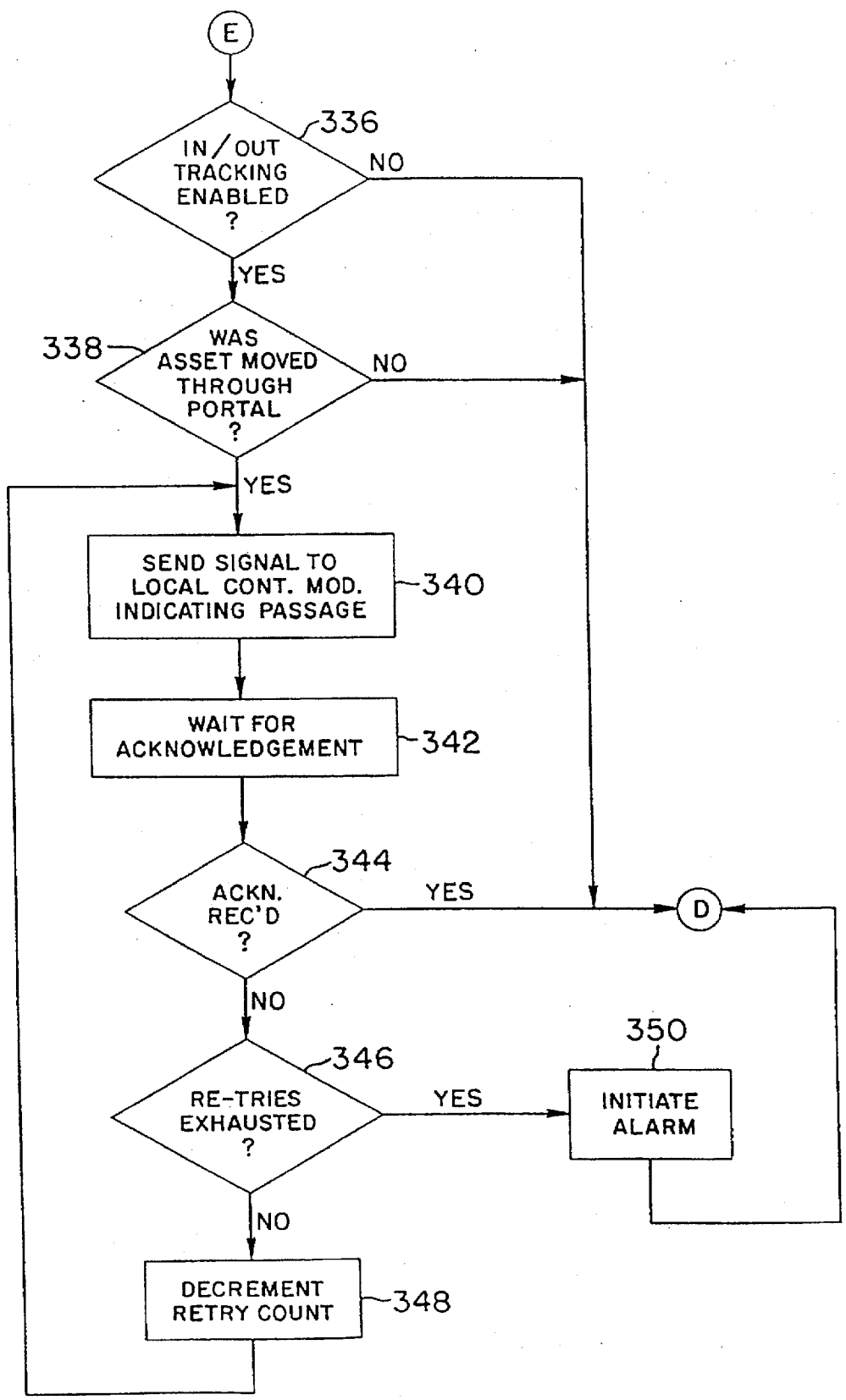

The operation of FIGS. 18A–18C begins with step 300 at which an interrogation signal is transmitted using one of the passage antennas. Following step 300 is step 302, at which it is determined whether a marker signal is received in response to the interrogation signal. If not, the operation loops back to step 300. Otherwise, step 304 follows step 302.

At step 304, it is determined whether more than one marker signal has been received in response to the interrogation signal. This may occur, for example, in the case where an employee carrying a badge which functions as a marker is carrying an object which has secured thereto a transponder which also functions as a marker. In this case, it is a possibility that the respective marker signals from the two markers might interfere with each other, unless some technique is provided for separating the two marker signals and reading the two marker signals separately. Accordingly, FIG. 18A shows a step 306 following step 304 if more than one marker signal is received. At step 306, a technique is provided for separately reading the two marker signals. A number of such techniques are known. For example, U.S. Pat. No. 4,471,345 issued to Barrett proposes that a plurality of response time slots be defined in a response interval which follows an interrogation signal. Each marker is then programmed to transmit its respective marker signal in a randomly selected one of the response time slots. In this way contention between the markers can usually be avoided.

According to another technique disclosed in U.S. Pat. No. 5,124,699, potentially contending transponders assign themselves a randomly generated priority number in response to a frequency shift in an interrogation signal. The transponders then count up to a predetermined number and the first to reach the number begins to transmit a transponder signal. The interrogating device receives the beginning of the marker signal and again shifts the frequency of the interrogation signal, which causes the other transponders to disable themselves.

Still another technique for resolving contention among plural transponders is disclosed in European patent specification no. 161,779. According to this technique, the transponders transmit their identification signals bit by bit and the interrogating device echoes back the value of each bit. When transponders contend, one of the bit values transmitted by the transponders dominates and is accepted by the interrogating device, which then echoes back that bit. The transponders receive the echo-back signal from the interrogating device, and if the echoed bit value does not match the bit value most recently transmitted by the transponder, the transponder disables itself for a random period before responding again to the interrogation signal. A transponder which receives back its entire identification signal correctly echoed by the interrogation device recognizes that its identification signal has been properly received by the interrogation device and then disables itself from further response to the interrogation signal.

It is contemplated to employ any of these techniques, or other known methods, in order to resolve contention among markers at step 306.

In addition, because potentially contending markers are usually separated in space, and interrogation is performed using alternately the two passage antennas provided on one side of the doorway, it is contemplated that one of the marker signals may dominate and be received by one of the two passage antennas, and the other marker signal may dominate and be received by the other passage antenna, so that no further contention resolution technique may be required.

In any event, after in some manner resolving contention between the two or more marker signals, the operation proceeds from step 306 to step 308, at which the data is read and a parity code or the like is checked to detect whether there are errors in the data. Next is step 310, which is a decision block as to whether the data is valid. If not, the operation loops back to step 300. Otherwise, the operation proceeds from step 310 to step 312. At step 312, the direction in which the markers are being moved is determined according to a procedure which will be described below in connection with FIGS. 19A, 19B and 19C. After determining the direction of movement of the marker at step 312, the operation proceeds to step 314, at which it is determined whether movement in the detected direction is intended to be controlled by the system. If not, the operation loops back from step 314 to step 300. Otherwise, the operation proceeds to step 316 (FIG. 18B), at which the reader 56 sends the data identifying the markers to its associated local control module 60. The reader 56 then waits for a response from the local control module (step 318). Next, at step 320, it is determined whether a response is received from the local control module within a predetermined period of time. If not the operation proceeds to step 322, at which it is determined whether the data has been sent to the local control module a predetermined number of times without receiving a response. If so, the operation proceeds to step 324, at which the reader 56 initiates an alarm condition to indicate that the local control module is failing to operate properly. From step 324 the operation then returns to step 300.

On the other hand, if at step 322 it was found that the number of re-tries was not exhausted, then the operation proceeds to step 326 from step 322. At step 326 a re-try count is decremented and the operation returns to step 316, so that the marker signal data is again sent to the local control module.

Returning to a consideration of step 320, if at that step a response is received from the local control module, it is next determined, at step 328, whether the response from the local control module authorizes passage through the doorway. It will be understood that access will be authorized in cases where one of the marker identification signals sent to the local control module was found by the local control module to be included in a database listing of identification signals for individuals authorized to pass through the doorway. If such was not the case, the local control module will not authorize passage, in which case the operation proceeds to step 330 from step 328. At step 330, it is determined whether the data has been sent to the local control module a predetermined number of times. If not, the operation proceeds to step. 326, which was described above. Otherwise, the operation returns to step 300.

If at step 328 passage through the doorway by the local control module was authorized, it is next determined, at step 332, whether the person whose passage was authorized is also authorized to move through the portal assets corresponding to the other marker signal or signals read at steps 306 and 308. This determination is made by the local control module on the basis of the identification code corresponding to the individual (i.e., employee badge number), the marker identification signal corresponding to the assets being moved toward or through the doorway, and also the direction of movement which was determined at step 312. If at step 332 it is determined that the removal of the asset or assets was not authorized, then step 334 follows, at which action is taken to inhibit the movement of the asset or assets. For example, any of the actions described above in connection with step 296 of FIG. 17B may be taken. In particular, even though the individual is authorized to pass through the doorway, the door may be maintained in a locked condition (assuming the portal includes a locked door subject to remote control by the reader) in order to prevent unauthorized removal of the assets. Alternatively, the door maybe unlocked, but a warning light may be actuated, or another type of alarm condition may be initiated, to inhibit the unauthorized removal of the assets. Alternatively, or in addition, a video image of the individual may be generated and recorded, as noted before.

After step 334, the operation returns to step 300.

On the other hand, if at step 332 it was found that removal of the asset or assets was authorized, then the operation proceeds to step 336 (FIG. 18C), at which it is determined whether the system is being operated in a mode to keep track of the respective locations from time to time of assets having markers secured thereto. If the system is not in this mode, then the operation loops back to step 300 from step 336. Otherwise, the operation proceeds from step 336 to step 338. At step 338, it is determined whether the asset or assets have been moved through the doorway associated with the reader 56. This determination is made according to the procedure illustrated in FIGS. 19A, 19B and 19C, as described below. If at step 338 the asset was not found to have been moved through the doorway, then the operation returns to step 300. Otherwise, the operation proceeds to step 340, at which the reader sends a signal to the associated local control module to indicate that the assets were in fact moved through the doorway. Then the reader waits (step 342) for a signal from the local control module by which the local control module acknowledges receipt of the signal sent at step 340. Next at step 344, it is determined whether the acknowledgment signal has been received within a predetermined period of time. If so, the operation returns to step 300. Otherwise, the operation proceeds to step 346, at which it is determined whether the signal indicating movement of the asset through the portal has been sent for a predetermined number of times. If not, a re-try count is decremented (step 348) and the operation returns to step 340 so that the signal is sent to the control module again. Otherwise, an alarm condition is initiated (step 350) to indicate that the control module is failing to respond properly and the operation then returns to step 300.

Referring again to step 304 (FIG. 18A), if at that step only one marker signal is found to be present, then step 351 follows. At step 351 either an asset movement control and/or tracking operation may be performed, or an access control operation may be performed, depending on the type of signal received. Since both types of operations have been previously described, no further details need be provided at this point.

Detecting Direction of Movement

Figure 19A:
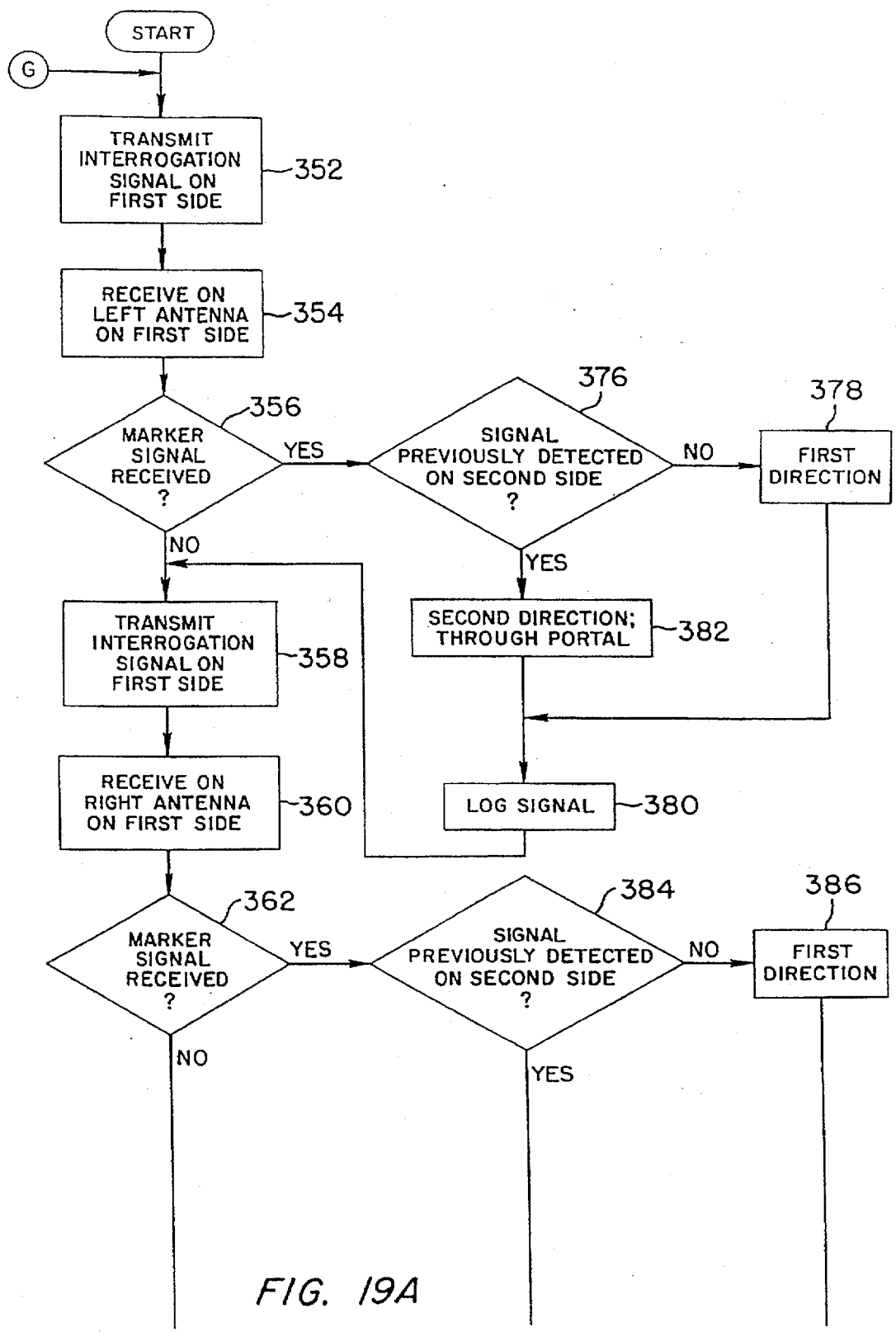
FIGS. 19A, 19B and 19C together form a flow chart that illustrates a manner of operating the reader of FIG. 10 so as to detect a direction in which an object is moved through a doorway.
Figure 19B:
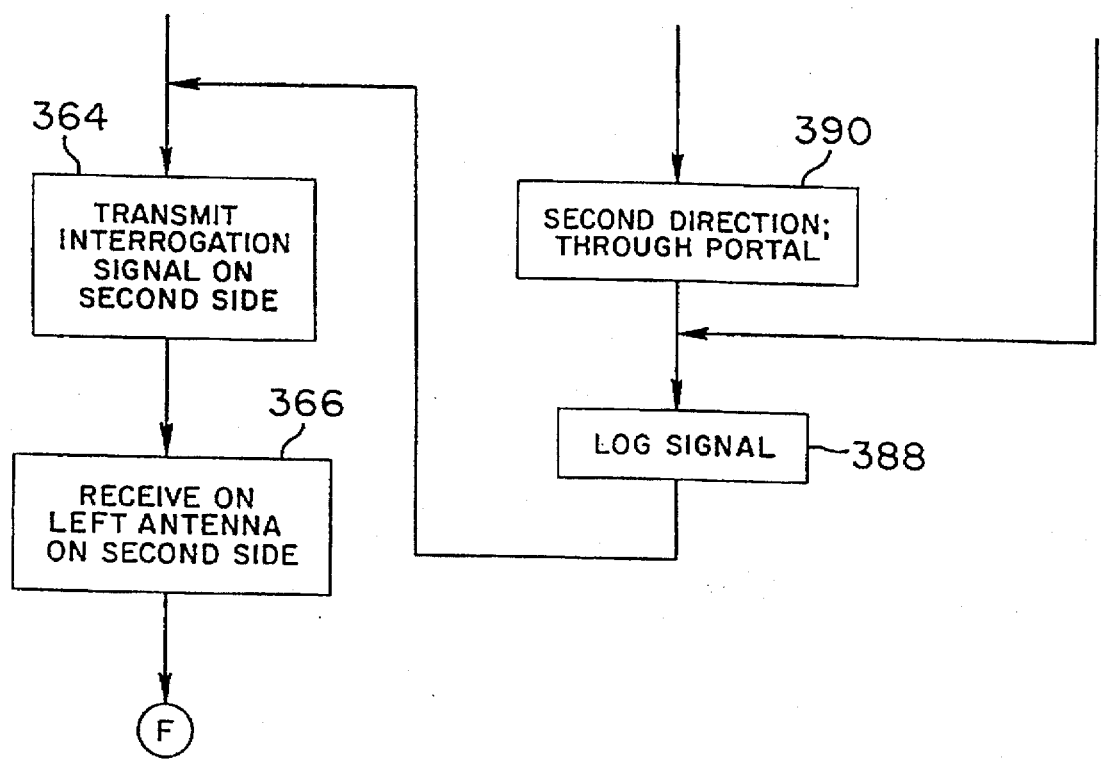
Figure 19C:
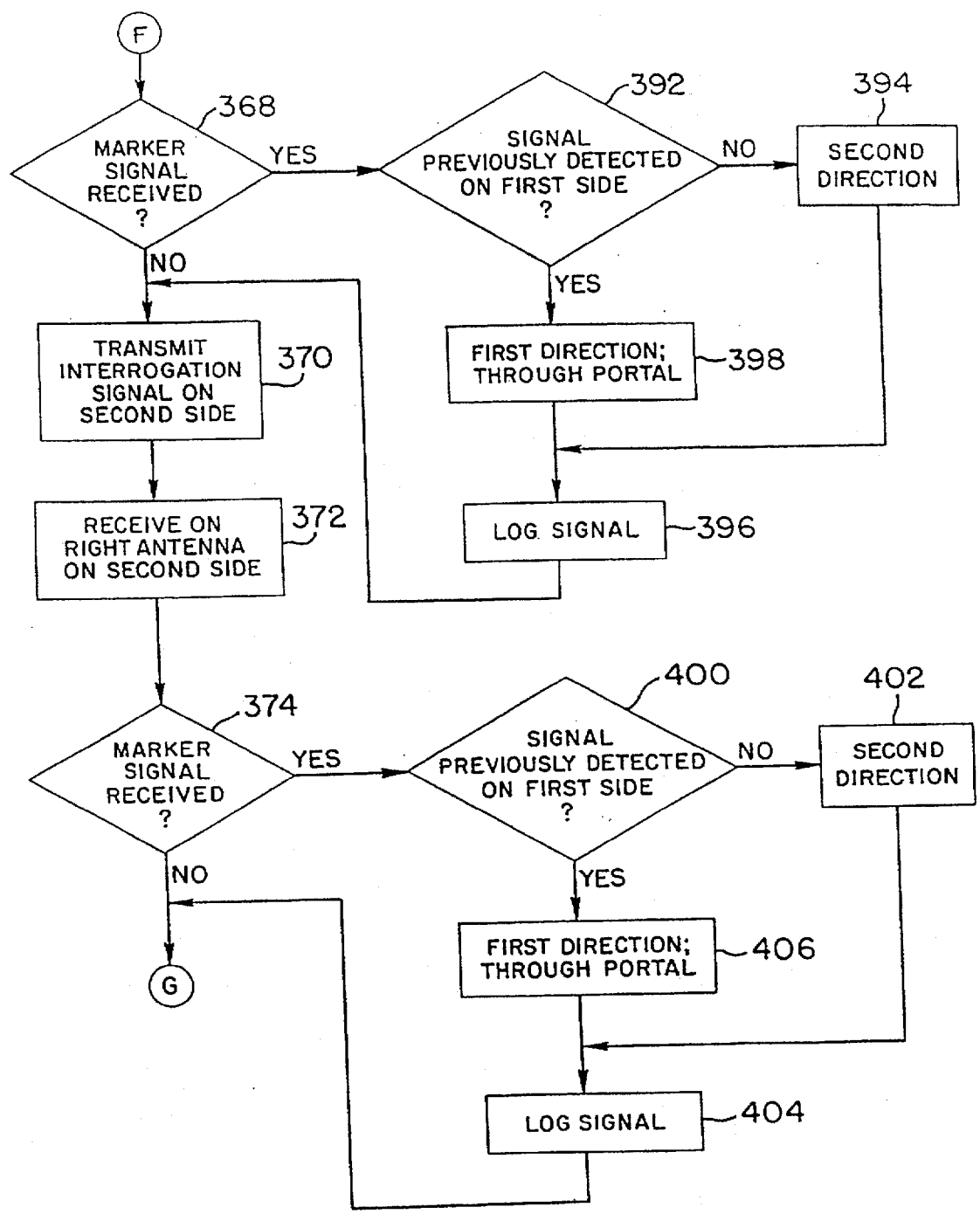

Referring now to FIGS. 19A, 19B and 19C, the procedure by which the reader detects the direction of movement through a portal, and whether movement through the portal actually occurs, will now be described. The procedure of FIGS. 19A, 19B and 19C begins with step 352, at which the reader generates an interrogation signal that is transmitted on one side of the doorway. According to one mode of operating the system, the interrogation signal is transmitted using one of the two passage antennas, assumed in this case to be the left-hand antenna (i.e., antenna 80 of FIG. 2). According to another mode of operating the system, the reader is connected directly to the shorted loop 82 and transmits the interrogation signal through the shorted loop 82.

In either case, the procedure proceeds from step 352 to step 354, at which the reader is placed in a condition for receiving signals via the left-hand antenna, on the same side of the doorway on which the interrogation signal was transmitted at step 352 (according to the previous assumption, this would be the passage antenna 80 of FIG. 2). The operation then proceeds from step 354 to step 356, at which it is determined whether a marker signal is received through the 1.eft-hand antenna in response to the interrogation signal of step 352.

If at step 356 no marker signal was received, then the operation proceeds to step 358 from step 356. At step 358 the interrogation signal is transmitted again on the same side of the doorway as in step 352, either through the right-hand passage antenna (antenna 78 in FIG. 2) or via the shorted loop 82, as the case may be. Following step 358 is step 360, at which, in either case, the reader 56 is placed in a condition to receive signals via the right-hand antenna (antenna 78). Step 362 then follows step 360. At step 362, it is determined whether a marker signal is received in response to the interrogation signal transmitted at step 358. If not, the procedure advances to step 364, at which the interrogation signal is transmitted from the portion of the antenna configuration on the opposite of the doorway. Again, depending upon the mode in which the system is operated, the interrogation signal is transmitted either through one of the passage antennas (i.e. antenna 80') or through the shorted loop 82'.

Following step 364 is step 366, at which the reader 56 is placed in a condition to receive signals via the passage antenna 80'. Following step 366 is step 368 (FIG. 19C). At step 368, it is determined whether a marker signal is received in response to the interrogation signal transmitted at step 364. If not, the procedure advances to step 370, at which the interrogation signal is again transmitted on the same side of the doorway as in step 364, either via the passage antenna 78' or the shorted loop 82'. Next, at step 372 the reader 56 is placed in a condition to receive signals via the passage antenna 78'.

Step 374 follows step 372. At step 374 it is determined whether a marker signal is received in response to the interrogation signal transmitted in step 370. If at step 374 no marker signal was found to have been received, then the procedure loops back to step 352.

It will be noted that so long as no marker signal is received at any of the steps 356, 362, 368 and 374, the reader 56 will continually loop through steps 352–374. In a preferred embodiment of the invention, the entire cycle of four interrogation signal transmissions (steps 352, 358, 364 and 372) can be completed in about one-third of a second.

It will now be assumed that a marker signal is received in response to one of the interrogation signals, and initially it will be assumed that the marker signal is received in response to the interrogation signal transmitted at step 352. In this case, the procedure advances from step 356 to step 376, at which it is determined whether the same marker signal (i.e., a signal containing the same identification data) has previously been detected on the other side of the doorway. If not, it is determined (step 378) that the marker and the object to which it is secured are being moved (or an attempt is being made to move the object) in the leftward direction in FIG. 2, which will be referred to as the "first direction". Then, the procedure advances to step 380, at which appropriate data; e.g., indicating the marker ID code and the detected direction of movement and the time of detection, are recorded. Following step 380 the procedure moves on to step 358, which has been discussed above.

On the other hand, if at step 376 it is determined that the same marker was previously and recently (e.g., within the past few seconds) detected at the other side of the portal, then the procedure moves to step 382 from step 376. At step 382, it is determined that the direction of movement of the marker and its associated object is in a "second direction" opposite to the first direction, which is the rightward direction in FIG. 2. It is also determined that movement of the object through the doorway has been accomplished. After step 382, appropriate data again is logged (step 380), in this case that the direction of movement is in the second direction and that the marker has been moved all the way through the portal. As before, step 358 follows step 380. (It is to be recognized that the determination of the direction of movement of the marker, and confirmation that the marker has in fact passed through the portal rather than merely having been brought near to one side of the portal, is greatly aided by the antenna configuration described above with reference to FIGS. 2 and 4–6, which produces the field distribution illustrated in FIGS. 7 and 9.)

Let it next be assumed that a marker signal is also received in response to the interrogation signal transmitted in step 358. (Of course, if a marker responds to the interrogation signal transmitted at step 352, it will also frequently be the case that the marker will respond into the interrogation signal transmitted immediately afterward at step 358.) Accordingly, the procedure will advance from step 362 to step 384, which is the same as step 376 and which is associated with steps 386, 388 and 390. Because the actions performed at steps 384 through 390 are the same as those performed at steps 376 through 382, it is believed to be unnecessary to further describe steps 384–390. However, it should be noted that at step 388 (as well as step 380) if the information to be stored is essentially the same as information already stored (i.e., differing only in terms of a small time increment), in that case either the logging of the more recent information may be omitted, or the older information may be replaced with the new information. It will be noted that upon completion of step 388, the procedure moves on to step 364.

Next let it be assumed that a marker signal is received in response to the interrogation signal transmitted at step 364. In that case, step 368 is followed by step 382, which, in turn, is associated with steps 394, 396 and 398. This group of steps may be considered a "mirror image" of steps 376–382 in that, at step 392, it is determined whether the same marker signal has previously and recently been detected on the first side of the doorway (it being recalled that the interrogation signal in step 364 was transmitted on the second side of the doorway). If the determination at step 392 is in the negative, then the direction of movement or attempted movement is determined to be the second direction (step 394), and appropriate data is stored (step 396), with the procedure then advancing to step 370. Of course, if at step 392 it is found that the same marker was previously detected on the first side, then it is determined that there has been a movement in the first direction, and all the way through the doorway (step 398). The procedure then moves through step 396 to step 370.

Finally, if the interrogation signal transmitted at step 370 results in a marker signal being received, then step 400 follows step 374. The group of steps made up of step 400 and associated steps 402, 404 and 406 is the same as steps 392–398, and therefore need not be further described. It will be noted that following the data logging activity of step 404, the procedure returns to step 352.

It was indicated above (at the end of the section entitled "Directional Characteristics of Antenna Configuration") that the antenna configuration 52 shown in FIG. 2 could be modified by replacing the shorted loop 82 with a loop that is switchable between the capacitive side of resonance and the inductive side of resonance with respect to the interrogation signal frequency. In that case, shorted loop 82' and passage antennas 78' and 80' could be eliminated, and the switching of the state of tuning of the loop could be used to selectively confine the effective interrogation region to one side or the other of the portal. As a result, steps 352 and 358 of FIG. 19A could be performed with the loop tuned (say) to the inductive side of resonance, and steps 364 and 370 would then be performed with the loop tuned to the capacitive side of resonance.

It is also within the contemplation of the invention to modify the antenna configuration 52 of FIG. 2 so as to include with the antenna configuration devices which permit determination of the direction of movement of persons or other objects through the portal without using the above-described techniques in which the direction of movement is detected on the basis of the marker identification signal. The non-identification-signal-based direction detection equipment may be used as a supplement to, or as a replacement for, the identification-signal-based techniques.

Figure 19D:
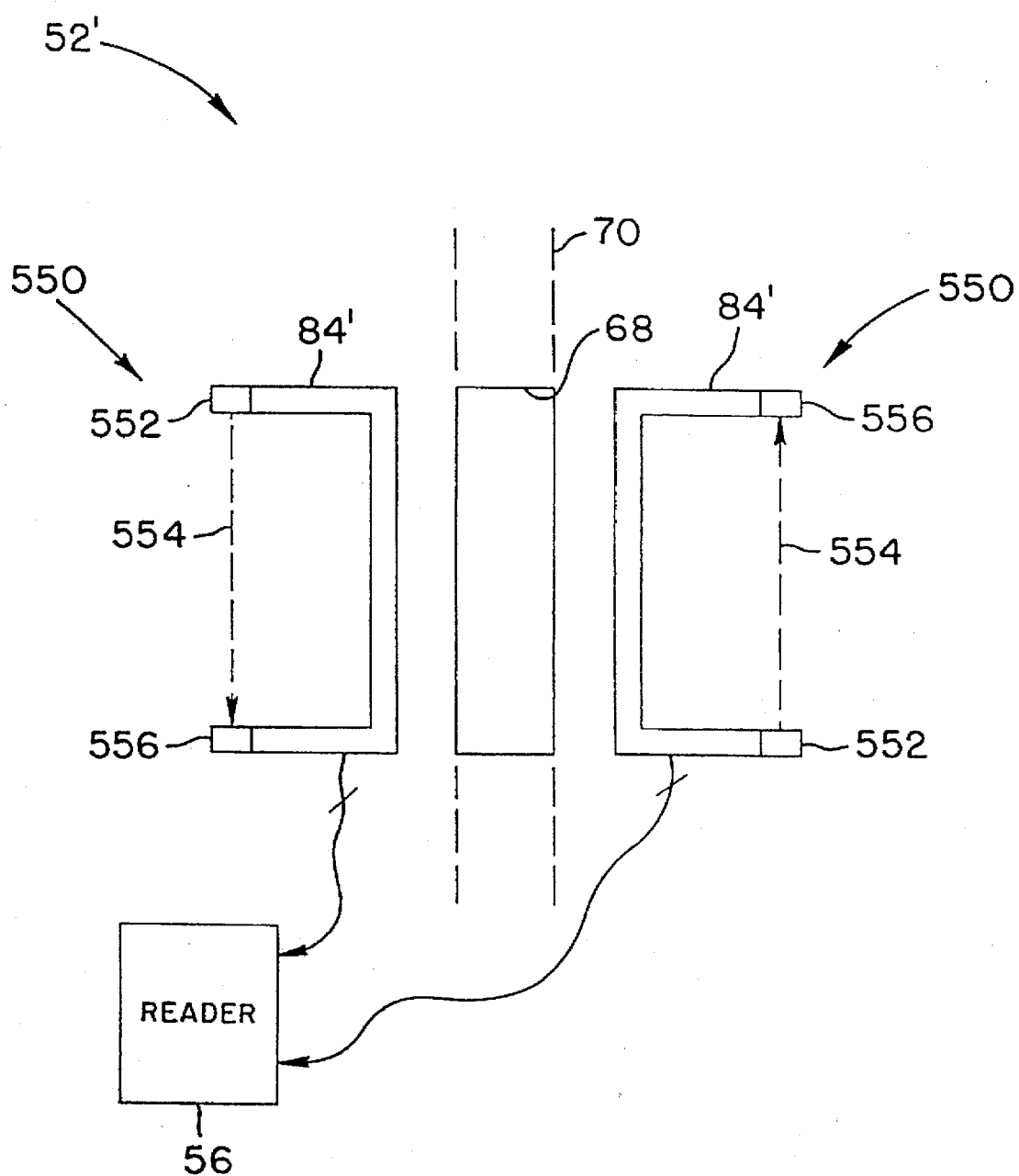
FIG. 19D is a schematic plan view of a portal antenna configuration having supplemental direction-of-movement detecting devices in accordance with an embodiment of the invention.

An antenna configuration 52', reflecting a modification in accordance with the latter aspect of the invention, is schematically illustrated in FIG. 19D. The configuration shown in FIG. 19C is a modification of the configuration 52 of FIG. 2. In the configuration 52' of FIG. 19D, an antenna assembly 84' is positioned on each side of the doorway 68. Each antenna assembly 84' is the same as the other, and may be a modified version of the antenna assembly 84 shown in FIG. 4. In particular, each of the antenna assemblies 84' includes an infra-red based motion detector 550. Each motion detector 550 is made up of a beam transmitting unit 552, which transmits an infra-red beam 554, and a beam receiving unit 556 for receiving the beam 554. When the beam 554' is interrupted as a result of the presence of a human being or other object in between the transmitting unit 552 and the receiving unit 556, the receiving unit 556 detects the absence of the beam 554 and generates an output signal. The output signals from the two beam receiving units 556 shown in FIG. 19D are supplied to the reader unit 56. When a person or other object passes through the doorway 68 the person or other object will interrupt both of the beams 554 in sequence, and the beam receiving unit 556 of the two motion detectors 550 will accordingly provide respective output signals in sequence to the reader 56. The order in which the respective output signals are received at the reader 56 can thus be used for determining the direction of movement through the doorway 68 of the person or object.

Although the two motion detectors 550 are shown in FIG. 19D as being on opposite sides of the doorway 68, it will be understood that both motion detectors 550 may be placed on the same side of the doorway at respective positions along a path of travel leading to the doorway 68. It is also contemplated to use other types of motion detection equipment including ultrasonic devices or devices of the type which transmit signals toward a fixed object and detect the time required for receipt of a signal reflected back from the fixed object. Changes in the time required for receipt of the reflected signal can be interpreted as indicative of the presence of a moving object such as a human being.

Asset Location Record Keeping

There will now be described, with reference to FIG. 20, operations carried out in the host computer 66 (FIG. 1) for the purpose of record keeping, and particularly for keeping records of the locations of assets to which markers have been attached.

Figure 20:
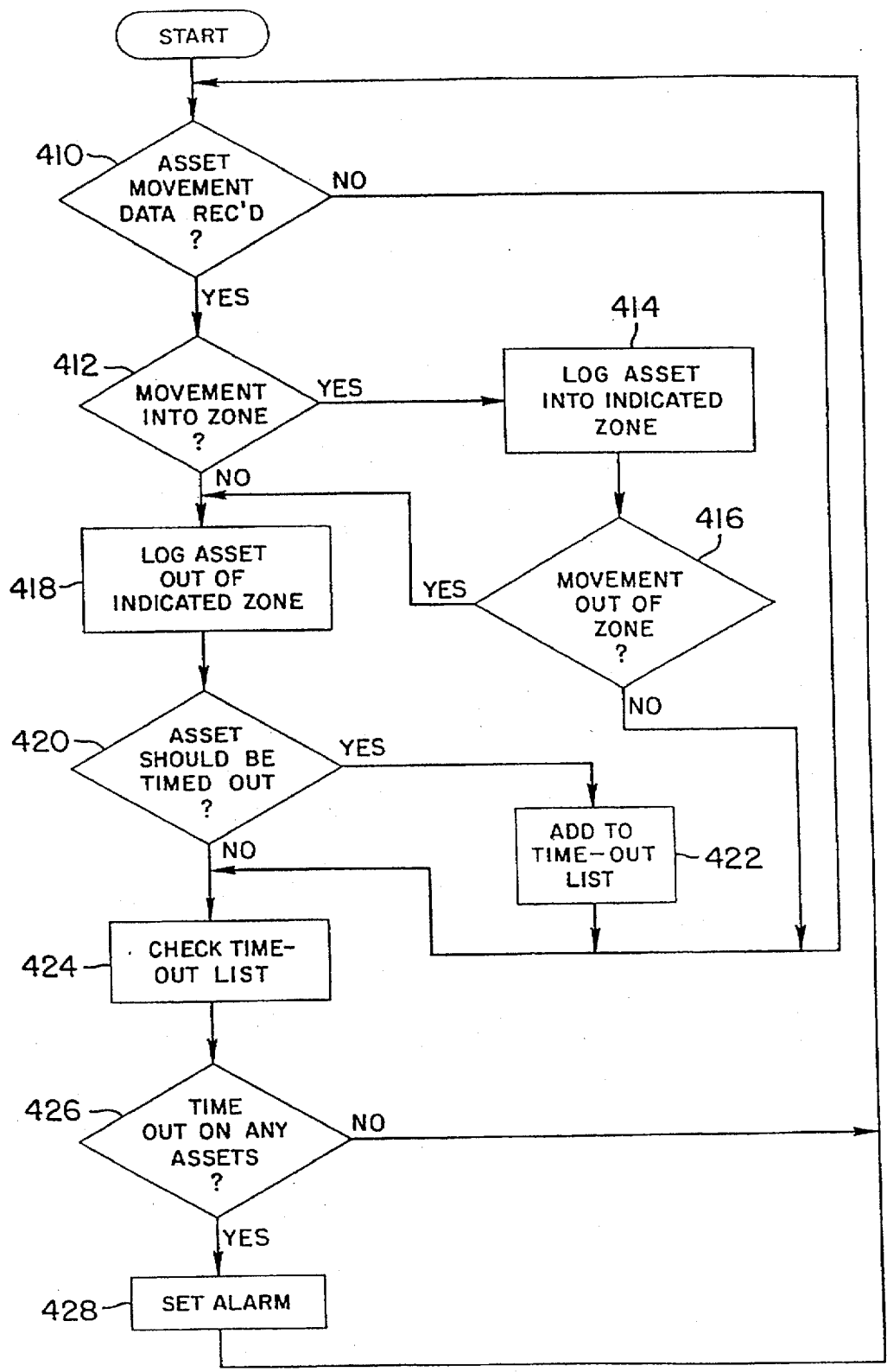
FIG. 20 is a flow chart which illustrates a manner of operating the system of FIG. 1 so as to maintain a record of the locations of a plurality of assets having markers attached thereto.

The operation of FIG. 20 begins with step 410, at which it is determined whether the host 66 has received data indicating movement of an asset (or at least a marker assumed to be secured to the asset) through a portal supervised by the system 50. It should be understood that the data might typically include the identification number of the asset (marker ID), the identification of the individual accompanying the asset through the doorway (employee badge ID), data identifying the portal through which the movement occurred and direction of movement through the portal, and the time of the movement. Typically, such information might be developed in any one of the steps 382, 390, 398 and 406 of the procedure of FIGS. 19A, 19B and 19C and the information would be relayed from the reader 56 associated with the particular doorway to the host 66 by way of the intervening local control module 60.

Continuing to refer to FIG. 20, let it be assumed that at step 410 data concerning an asset movement through a doorway has been received. For example, the received data may indicate movement of a particular asset in the direction indicated by arrow 211-1 through the doorway at which the antenna assembly 52-1 is installed (see FIG. 3). Another possibility might be data indicating movement in the direction indicated by arrow 211-3 through the doorway at which antenna assembly 52-3 is installed.

In either one of these cases, it would be determined at step 412 (which follows step 410), that the received data indicates movement into a zone. In such a case, the operation proceeds to step 414, at which the host 66 stores a data record indicating that the particular asset is present in the indicated zone. In case of either one of the movements indicated by arrows 211-1 or 211-3, the resulting data in the host 66 would indicate that the asset in question is in zone 1. The data stored at step 414 may also include the time at which the movement took place and information corresponding to an employee identification badge detected as accompanying the asset marker. In this way an individual can be identified as having moved the asset into the zone, and a corresponding record can be maintained.

Following step 414 is step 416, at which it is determined whether the detected direction of movement through the doorway in question results in the asset being moved out of the zone. If so, the host 66 amends an appropriate data entry to indicate that the asset is no longer in the zone from which it has been removed (step 418). This would be necessary, for example, if the direction of movement was such as indicated by arrow 211-3, in which case the asset was not only being moved into zone 1 but also was being moved out of zone 2.

Another function of host computer 66 which is illustrated in FIG. 20 is that of keeping track of how long assets have been out of particular zones (which might be considered "home zones" for the assets), and taking appropriate action if an asset has been out of its home zone for more than a predetermined period of time.

In accordance with this function, a step 420 is provided after the above-mentioned step 418. At step 420, it is determined whether the movement of the particular asset out of the indicated zone means that a time period should be monitored with respect to the asset. If so, the asset should be added to a list of assets for which a time-keeping function is being performed (step 422). It will be understood that the list may include an entry for each item being timed out, and that the entry for each item may include the item identification code, the home zone, the time at which the item was removed from the home zone, the time at which the item is due to be returned to the home zone, and the identity of the individual detected, via a badge signal, as having removed the item from the home zone.

A step 424 is provided either immediately following step 420 or following step 422, as the case may be. At step 424, the list of items being timed out is checked to see whether the permitted period of time has been exceeded (step 426). If not, the operation of FIG. 20 loops back to step 410. Otherwise, an alarm condition may be set, or other appropriate action may be taken (step 428) before returning to step 410.

It will be understood that step 414 may, where appropriate, include removing an asset from the time-out list when the indicated movement of the asset constitutes returning the asset to its home zone.

It will also be noted that if the determination at step 412 is in the negative, i.e., that an asset is not being moved into a zone, then the operation of FIG. 20 proceeds immediately to step 418 for logging the asset out of an indicated zone. This is because it can be assumed on the basis of step 410 that data indicating movement either into or out of the zone has been received.

Storage Facility Monitoring

There will now be described another embodiment of the invention, in which assets are tracked with respect to particular storage places in a storage facility, rather than with respect to zones and portals as in the embodiment of FIG. 1.

Figure 22:
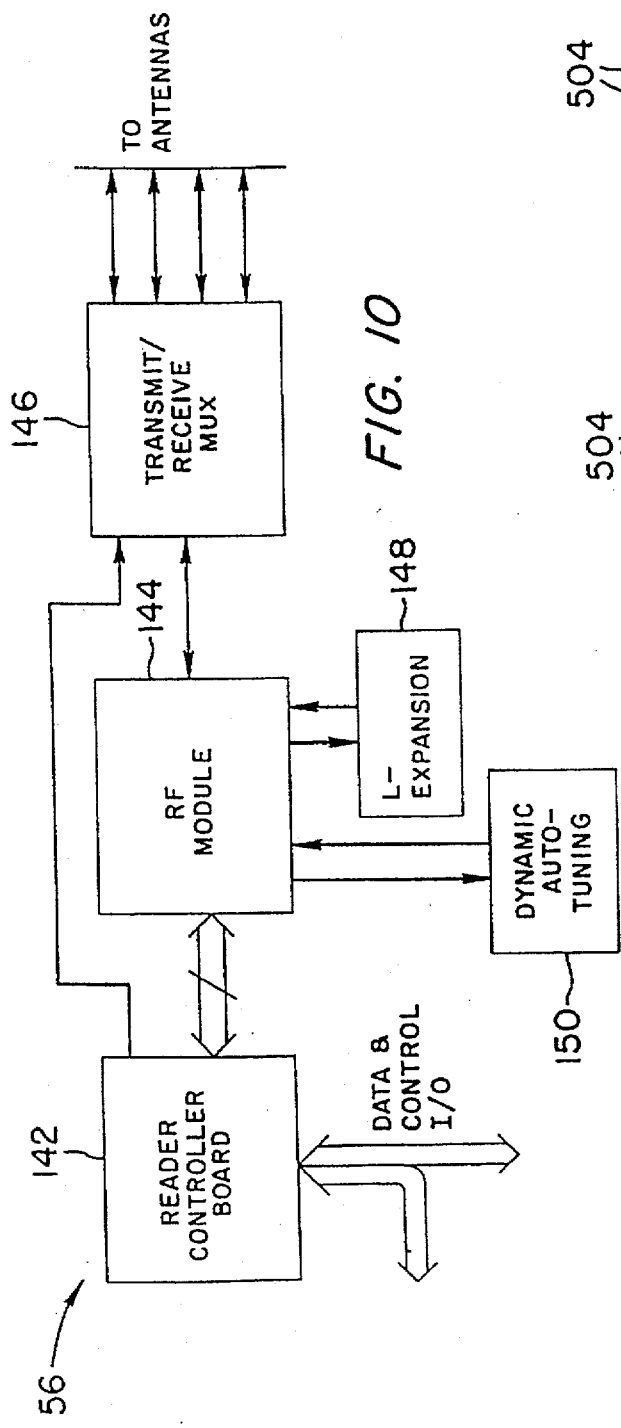
FIG. 22 is a schematic illustration of a portion of an automobile parking facility to which the system of FIG. 21 is applied.
Figure 21:
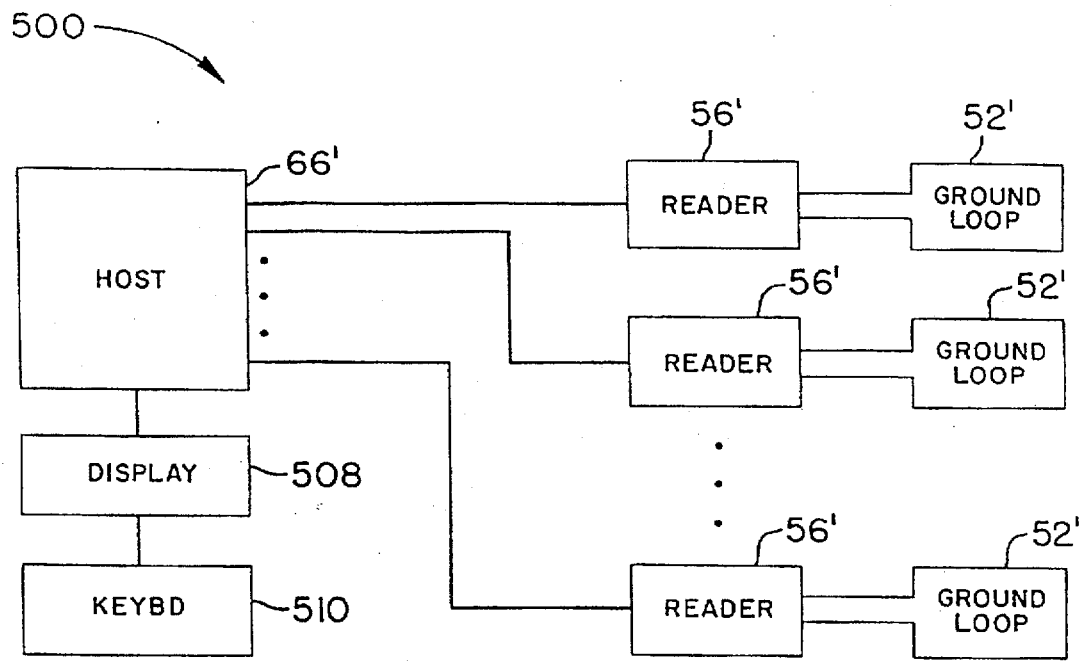
FIG. 21 is a high level block diagram of a system for keeping track of the locations of automobiles within a parking facility.

Referring initially to FIGS. 21 and 22, reference numeral 500 (FIG. 21) refers generally to a system for tracking the locations of vehicles parked within a parking facility such as a parking garage. The parking garage is indicated by reference numeral 502, and is shown schematically and in part in FIG. 22. It will be observed that the parking garage 502 includes a number of parking spaces 504 and that the system 500 includes a plurality of reading devices 56', each of which is installed at a respective one Of the parking spaces 504. A ground loop antenna 52' is installed in the floor of each parking space and is connected to the reader 56' installed at the parking space. Preferably each ground loop antenna is arranged in a horizontally oriented plane just beneath the top surface of the corresponding parking space and is arranged as a rectangular loop that is about 3 ft.×6 ft. (It will be noted that, for purposes of illustration, the ground loops 52' have been shown as being somewhat larger than an automobile, notwithstanding the preferred dimensions just given.)

Figure 14:
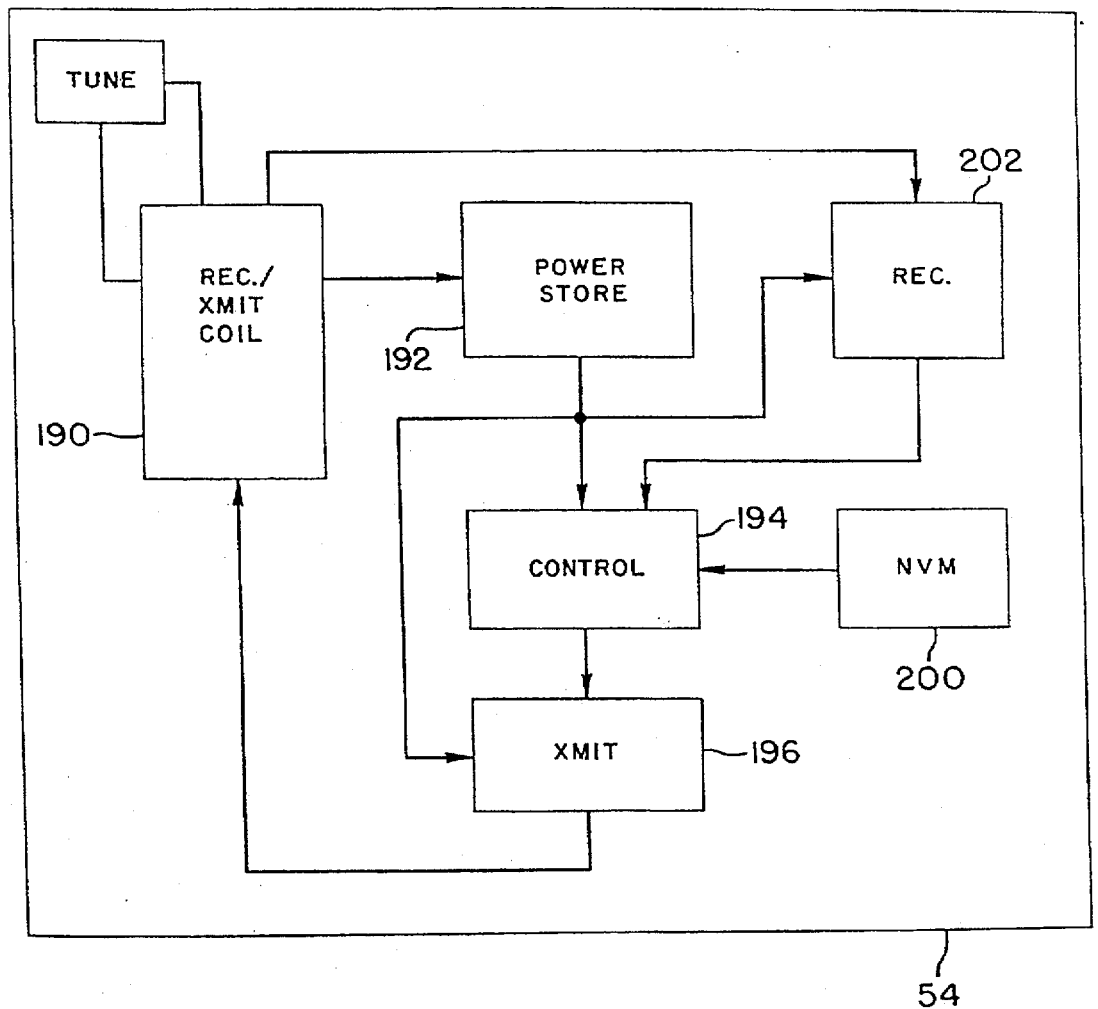
FIG. 14 is a simplified block diagram of the electronic components of the transponder of FIG. 13.

Markers 54, which may be like the transponder shown in FIGS. 13 and 14, are respectively attached to vehicles 506, appointed for storage in the parking facility 502. The markers 54 may be conveniently be installed on the underside of the vehicles 506. Preferably each marker 54 transmits a marker identification signal that is unique to the marker and hence uniquely identifies the corresponding vehicle. The readers 56' are connected for data communication with a host computer 66', either directly, or via intervening devices (not shown) such as local control modules. Associated with the host computer 66' are a display 508 and a keyboard 510 for output and input of data from and to the host computer 66'.

Figure 23:
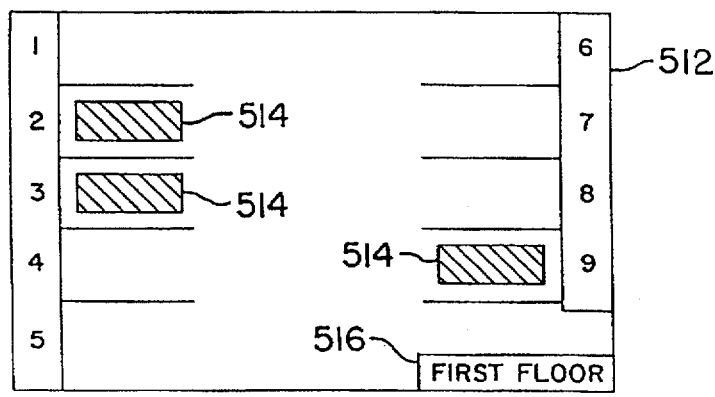
FIG. 23 is a simplified illustration of a screen display provided by the system of FIG. 21.

FIG. 23 depicts in somewhat schematic terms a screen display 512 provided on the display 508 in accordance with the invention. The screen display 512 includes a schematic representation of at least a portion of the parking facility 502, with icons 514 indicating the presence of vehicles detected in corresponding parking spaces in the parking facility. It will be understood that an icon is provided in the screen display 512 at a position corresponding to a parking location in which a vehicle is presently detected. The screen display 512 is shown as including character information 516 indicating the portion of the parking facility which the current screen display represents. Other or additional character information may be provided on the screen display 512, such as, for example, number of spaces currently occupied and/or number of spaces currently vacant in the facility or on the floor to which the screen display relates; and information relating to the detected vehicles. Some or all of this information may initially be hidden (i.e. not visible on the screen display) but subject to being selectively displayed upon "clicking", an appropriate portion of the display. For example, available capacity of the first floor could be displayed in response to "clicking" the character information 516. Similarly, the system 500 may be arranged so that when one of the icons 514 is "clicked", information identifying the vehicle in the corresponding parking space is displayed.

It is to be understood that the screen display shown in FIG. 23 is generated by the host computer 66' based on data stored in the computer. The data preferably includes information required to provide the schematic floor layouts, as well as a database relating to the vehicles presently detected in the storage spaces of the facility and vehicles expected to be present in the facility from time to time. The vehicle information may include, for example, make, model, color, license number, name of driver/owner, and so forth.

It is also contemplated that the host 66' could be queried to indicate which portions of the facility are full or have space available, the distribution of vehicles among floors, and so forth. In addition, queries could be made as to the location of a particular vehicle (e.g., "Where is Ms. Smith's car?"), and in response to the query, the host 66' would display the appropriate screen display corresponding to the portion of the facility where the particular vehicle is located and then could cause the icon corresponding to that vehicle to flash to indicate the particular parking space in which the vehicle is located.

Figure 24:
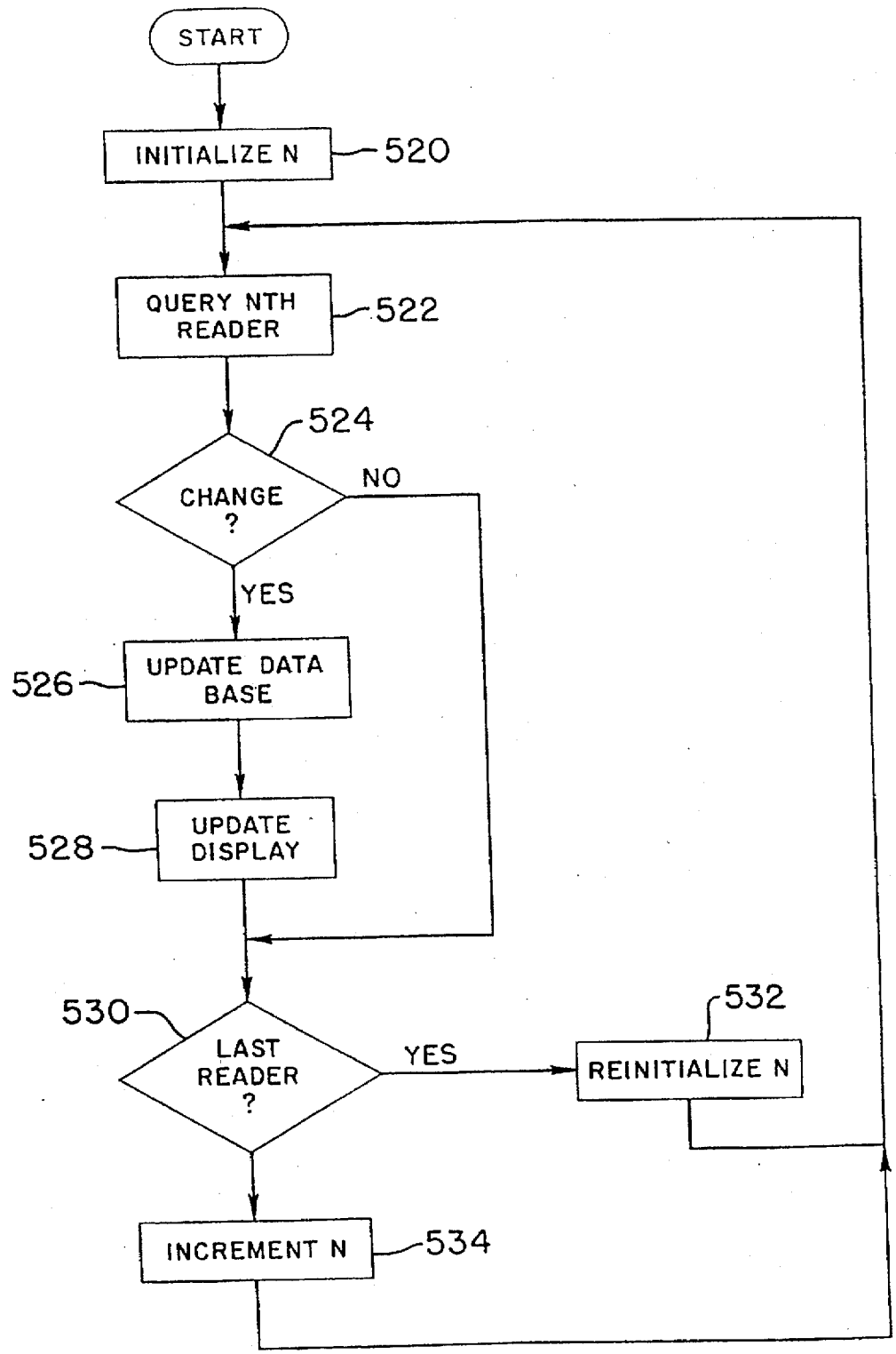
FIG. 24 is a flow chart which illustrates operation of the system of FIG. 21.

There will now be described with reference to FIG. 24, a procedure by which the host computer 66' keeps up to date on the vehicles detected as being present in parking spaces of the parking facility 502. The procedure of FIG. 24 begins with step 520, at which a count value N is initialized. Then the procedure goes on to step 522, at which the host computer 66' queries the reader pointed to by the present value of N. The queried reader then responds by providing to the host computer 66' a data message indicating whether any vehicle is present at the parking space at which the reader is installed, and if so, also indicating the identification data for the detected vehicle.

Step 524 follows step 522. At step 524, it is determined whether the data received from the reader represents a change from data as currently stored in the database. If so, the host 66' proceeds to update the database (step 526) and also, if appropriate, to update the screen display (step 528). Following step 528 is step 530, at which it is determined whether the reader just queried is the last reader. If so, the count value N is reinitialized (step 532) and the procedure then returns to step 522. Otherwise, N is incremented (step 534) before the procedure returns to step 522. It will be understood that step 530 immediately follows step 524 if it is determined at step 524 that the data received from the reader does not indicate a change with respect to the data stored in the host computer 66'.

It is contemplated that the system 500 of FIG. 21 can be advantageously applied to a parking lot for rental cars, with the addition of a reader and ground loop installed in proximity to an exit gate of the parking lot. The latter reader would be used to selectively open the gate so that only vehicles which are properly authorized may be removed from the parking lot.

The system shown in FIG. 21 can also be adapted for use in other types of storage facilities in addition to vehicle parking facilities. For example, suitable location-specific antennas (which may, but need not, be ground loops) can be installed in a warehouse, and transponders can be installed in pallets that are used to support goods stored in the warehouse. The system then could store information which relates transponder identification codes to the type of goods stored on the corresponding pallets, and the locations of the goods in the warehouse could then be automatically tracked by the system. Alternatively, transponders can be secured directly to the items of inventory, particularly in the case of large items like major appliances.

Various changes to the foregoing systems may be introduced without departing from the invention. The particularly preferred embodiments described herein are thus intended in an illustrative and not limiting sense. The true spirit and scope of the invention is set forth in the following claims.

What is claimed is:

1. A system for automatically maintaining records of respective locations of a plurality of objects in real time, the system comprising:
   a plurality of object markers each physically associated with a respective one of said plurality of objects for movement with the respective object, each marker transmitting an identification signal that is unique to the respective object;
   a plurality of sensor devices each installed at a respective doorway of a building, each said device for receiving said identification signal transmitted from said object marker as the respective object is moved through the respective doorway and for detecting a direction in which the respective object is moved through the doorway, each said device generating a detection signal indicative of said detected direction of movement and said identification signal of the respective object in response to said device receiving said identification signal; and
   data processing means for receiving the detection signals from the sensor devices and for maintaining a data record with respect to each of said objects, each said data record including data indicative of a present location in said building of the respective object.

2. A system according to claim 1, wherein at least a first sensor device and a second sensor device of said plurality of sensor devices are installed at respective doorways located at respective points on a boundary of a zone in said building, said respective doorways at which said first and second sensor devices are installed each having associated therewith a first direction of movement defined as a movement into said zone and a second direction of movement defined as a movement out of said zone, said data processing means being programmed to respond to a detection signal generated from either of said first and second sensor devices and indicative of a movement of a particular one of said objects in said first direction of movement by updating the data record for said particular one of said objects to indicate that said particular one of said objects is inside said zone.

3. A system according to claim 2, wherein said data processing means is further programmed to respond to a detection signal generated from either of said first and second sensor devices and indicative of a movement of said particular one of said objects in said second direction of movement by updating the data record for said particular one of said objects to indicate that said particular one of said objects is not inside said zone.

4. A system according to claim 3, wherein said second direction of movement at said doorway at which said first sensor device is installed is defined as a movement into a second zone, and said data processing means is further programmed to respond to a detection signal generated from said first sensor device and indicative of a movement of said particular one of said objects in said second direction of movement by updating the data record for said particular one of said objects to indicate that said particular one of said objects is inside said second zone.

5. A system according to claim 4, wherein said second direction of movement at said doorway at which said second sensor device is installed is defined as a movement into a third zone, and said data processing means is further programmed to respond to a detection signal generated from said second sensor device and indicative of a movement of said particular one of said objects in said second direction of movement by updating the data record for said particular one of said objects to indicate that said particular one of said objects is inside said third zone.

6. A system according to claim 1, further comprising a plurality of badges each physically associated with a respective one of a plurality of individuals for movement with the respective individual, each said badge transmitting a badge signal that is unique to the respective individual; and wherein:
   each said sensor device receives the badge signal transmitted by said badge as the respective individual moves through the respective doorway and generates a badge detection signal indicative of detection of said badge; and
   said data processing means receives the badge detection signals from the sensor devices and includes in said data record for each of said objects data indicative of an identity of an individual who was present when said object was moved through a respective doorway.

7. A system according to claim 6, further comprising:
   an alarm device; and
   control means, operatively connected to said alarm device and said data processing means, for selectively actuating said alarm device on the basis of at least one of a detected direction of movement of an object, a received identification signal for said object, and a received badge signal for an individual accompanying said object.

8. A system according to claim 7, wherein said alarm device produces an audible alarm when actuated by said control means.

9. A system according to claim 7, wherein said alarm means produces a visible alarm when actuated by said control means.

10. A system according to claim 6, further comprising:
    a video camera;
    recorder means for storing video signals generated by said video camera; and
    control means, operatively connected to said video camera, said recorder means and said data processing means, for selectively controlling said video camera to generate, and said recorder means to record, a video signal representative of an individual moving one of said objects through one of said doorways.

11. A system according to claim 10, wherein said video signal representative of said individual moving said object is selectively generated and stored on the basis of at least one of a detected direction of movement of said object, a received identification signal for said object, and a received badge signal for said individual.

12. A system according to claim 6, further comprising:
    a door having a locking mechanism and provided in one of said doorways for selectively preventing movement through said doorway; and
    control means, operatively connected to said locking mechanism and responsive to the respective sensor device installed at said doorway, for selectively placing said locking mechanism in a locked condition.

13. A system according to claim 12, wherein said locking mechanism is selectively placed in said locked condition on the basis of at least one of the direction of movement of said object detected by said respective sensor device, said identification signal received by said respective sensor device, and said badge signal received by said respective sensor device.

14. A system according to claim 1, wherein each of said sensor devices includes interrogation means for transmitting an interrogation signal and each of said object markers transmits the identification signal only in response to said interrogation signal.

15. A system according to claim 14, wherein each of said object markers includes:

energy storage means for receiving said interrogation signal and for being charged up by the received interrogation signal so as to be placed in a condition in which energy is stored in said energy storage means; and transmission means, connected to the energy storage means, for receiving the energy stored in said energy storage means and for transmitting said identification signal.

16. A system according to claim 15, wherein said energy storage means comprises a capacitor.

17. A system according to claim 1, further comprising printer means, controlled by said data processing means, for printing a report of said data records for said objects.

18. A system according to claim 1, wherein at least some of said sensor devices include means for detecting the direction in which the respective object is moved through the doorway on the basis of said received identification signal.

19. A system according to claim 1, wherein at least some of said sensor devices each include a plurality of motion detection means for detecting the presence of objects regardless of whether such objects have an object marker physically associated therewith, and the respective sensor device detects the direction in which the respective object is moved through the doorway on the basis of signals output from the respective plurality of motion detection means.

20. A system according to claim 1, wherein at least some of said sensor devices each include:

(a) means for detecting the direction in which the respective object is moved through the doorway on the basis of said received identification signal; and (b) a plurality of motion detection means for detecting the presence of objects regardless of whether such objects have an object marker physically associated therewith; the respective sensor device also being arranged to detect the direction in which the respective object is moved through the doorway on the basis of signals output from the respective plurality of motion detection means.

21. A system for selectively inhibiting movement of an object, the system comprising:

marker means, physically associated with said object, for transmitting a marker signal;

sensor means, installed at a doorway, for receiving said marker signal transmitted from said marker means as the object is moved through said doorway and for detecting a direction in which said object is moved through the doorway, said sensor means generating a detection signal indicative of said detected direction of movement; and control means responsive to said sensor means for determining on the basis of said detection signal whether movement of said object through said doorway in said detected direction is authorized and for inhibiting movement of said object in said detected direction of movement if said control means determines that said movement of said object in said detected direction is not authorized.

22. A system according to claim 21, wherein said control means includes means for generating an alarm if said movement of said object in said detected direction is not authorized.

23. A system according to claim 22, wherein said alarm is at least one of an audible alarm and a visible alarm.

24. A system according to claim 21, further comprising a door having a locking mechanism and provided in said doorway for selectively preventing movement through said doorway; and wherein said control means includes means for placing said locking mechanism in a locked condition if said movement of said object in said detected direction is not authorized.

25. A system according to claim 21, further comprising badge means, physically associated with an individual for movement with said individual, for transmitting a badge signal;

said sensor means receiving said badge signal as said individual moves through said doorway with said object; and said control means selectively inhibiting said movement of said object on the basis of said badge signal and said marker signal.

26. A system according to claim 21, further comprising a plurality of marker means each physically associated with a respective one of a plurality of objects for movement with the respective object, each said marker means transmitting a marker signal that is unique to the respective object; said sensor means receiving said unique marker signal when the respective object is at said doorway; and said control means selectively inhibiting movement of the respective object through said doorway on the basis of said received unique marker signal.

27. A system according to claim 26, wherein said control means selectively inhibits movement of the respective object through said doorway on the basis of a detected direction of movement of the respective object and said received unique marker signal.

28. A system according to claim 26, further comprising a plurality of badge means each physically associated with a respective individual for movement with the respective individual, each said badge means transmitting a badge signal that is unique to the respective individual; said sensor means receiving said unique badge signal when the respective individual is at said doorway; and said control means selectively inhibiting movement through said doorway of at least some of said objects in the absence of an authorized individual.

29. A system according to claim 28, wherein said control means selectively inhibits movement of said at least some objects in the absence of an authorized individual and on the basis of a detected direction of movement of said at least some objects.

30. A system for determining the respective positions of a plurality of objects within a storage facility that includes a plurality of object storage locations, each of said storage locations being sized and shaped to permit storage of only one of said objects in the respective location, the system comprising:

a plurality of object markers each physically associated with a respective one of said plurality of objects for movement with the respective object, each said marker transmitting a marker signal that is indicative of the presence of the respective object;

a plurality of sensor devices each installed at a respective one of the object storage locations in said facility, each said device for receiving a respective marker signal for an object present at the respective storage location; and data processing means connected to said sensor devices for storing with respect to each storage location an indication signal which indicates whether one of said objects is present at said storage location.

31. A system according to claim 30, further comprising display means, controlled by said data processing means, for displaying said indication signals.

32. A system according to claim 20, wherein each of said object markers transmits an identification signal that is unique to the respective object.

33. A system according to claim 30, wherein said objects are motor vehicles and said object storage locations are parking spaces for said motor vehicles.

34. A system according to claim 30, wherein each said sensing device includes a loop antenna installed in the floor of the respective parking space.

* * * * *

UNITED STATES PATENT AND TRADEMARK OFFICE
CERTIFICATE OF CORRECTION

PATENT NO. : 5,708,423
DATED : January 13, 1998
INVENTOR(S) : Ghaffari et al.

It is certified that error appears in the above-identified patent and that said Letters Patent is hereby corrected as shown below:

| | | | | |
|---|---|---|---|---|
| Col. 11, | line 33, | after "marker" | and insert | -- 54. --. |
| Col. 15, | line 37, | delete "0n" | and insert | -- On --. |
| Col. 15, | line 57, | delete "ms" | and insert | -- is --. |
| Col. 20, | line 64, | delete "l.eft-hand" | insert | -- left-hand --. |
| Col. 23, | line 26, | delete "554'" | and insert | -- 554 --. |
| Col. 25, | line 23, | delete "Of" | and insert | -- of --. |
| Col. 32, | line 1, | delete "20" | and insert | -- 30 --. |

Signed and Sealed this

Sixteenth Day of June, 1998

*Attest:*

*Attesting Officer*

BRUCE LEHMAN
*Commissioner of Patents and Trademarks*

UNITED STATES PATENT AND TRADEMARK OFFICE
CERTIFICATE OF CORRECTION

PATENT NO. : 5,708,423
DATED : January 13, 1998
INVENTOR(S) : Ghaffari, et al.

It is certified that error appears in the above-identified patent and that said Letters Patent is hereby corrected as shown below:

Col. 32, line 7 delete "30" and insert --33--.

Signed and Sealed this

Twenty-fifth Day of May, 1999

Attest:

Q. TODD DICKINSON

*Attesting Officer*   *Acting Commissioner of Patents and Trademarks*